(12) United States Patent
Muckelrath et al.

(10) Patent No.: US 8,419,029 B2
(45) Date of Patent: Apr. 16, 2013

(54) HEAVY-DUTY AXLE/SUSPENSION SYSTEM

(75) Inventors: Brett L. Muckelrath, North Canton, OH (US); Donald R. Hester, East Canton, OH (US); Sri Satya Teja Kakarla, Canton, OH (US); James J. Patterson, North Canton, OH (US); Brian R. Anderson, Canton, OH (US); R. Scott Fulton, Hudson, OH (US); Keith D. McComsey, Hinckley, OH (US); Brian R. Morris, Uniontown, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 115 days.

(21) Appl. No.: 13/043,668

(22) Filed: Mar. 9, 2011

(65) Prior Publication Data
US 2011/0221156 A1    Sep. 15, 2011

Related U.S. Application Data

(60) Provisional application No. 61/312,304, filed on Mar. 10, 2010.

(51) Int. Cl.
*B60G 9/02* (2006.01)
(52) U.S. Cl.
USPC ....... 280/124.116; 280/124.128; 280/124.153
(58) Field of Classification Search ........... 280/124.116, 280/124.128, 124.129, 124.13, 124.153, 280/124.157, 124.11
See application file for complete search history.

(56) References Cited

U.S. PATENT DOCUMENTS

| | | | |
|---|---|---|---|
| 4,615,539 A | 10/1986 | Pierce | |
| 4,693,486 A | 9/1987 | Pierce et al. | |
| 5,112,078 A | 5/1992 | Galazin et al. | |
| 5,116,075 A * | 5/1992 | Pierce | 280/124.116 |
| 5,366,237 A * | 11/1994 | Dilling et al. | 280/124.116 |
| 5,634,655 A * | 6/1997 | Chalin | 280/124.165 |
| 6,508,482 B2 | 1/2003 | Pierce et al. | |
| 6,725,743 B2 * | 4/2004 | White | 74/607 |
| 6,827,360 B2 * | 12/2004 | Chan et al. | 280/124.116 |
| 7,347,435 B2 * | 3/2008 | Chalin | 280/124.116 |

(Continued)

FOREIGN PATENT DOCUMENTS

| | | |
|---|---|---|
| EP | 0240649 B1 | 2/1992 |
| EP | 0625440 A1 | 11/1994 |
| WO | 9706022 | 2/1997 |

*Primary Examiner* — Paul N Dickson
*Assistant Examiner* — Timothy Wilhelm
(74) *Attorney, Agent, or Firm* — Dureska, Kennedy & Moore, L.L.C.; David P. Dureska; Brent L. Moore

(57) ABSTRACT

An air-ride beam-type axle/suspension system for a heavy-duty vehicle with a gross axle weight rating of greater than 23,000 lbs./axle includes a pair of transversely spaced beams. Each one of the beams includes inboard and outboard sidewalls. A large diameter axle extends between and is rigidly connected to the beams via a pair of axle-to-beam connections. Each one of the axle-to-beam connections includes a sleeve having an increased thickness rigidly connected to the axle and the beam. Each sleeve is formed with at least a front and a rear window located between the beam sidewalls. The inboard and/or outboard edges of the sleeve windows are spaced relatively far from the beam sidewalls. The sleeve windows are asymmetrically angled with respect to the horizontal centerline of the axle at design ride height. The axle/suspension system reduces weight while maintaining desired stiffness and durability of the axle/suspension system.

28 Claims, 15 Drawing Sheets

U.S. PATENT DOCUMENTS

| | | | |
|---|---|---|---|
| 7,360,774 B2* | 4/2008 | Saieg et al. | 280/124.128 |
| 7,740,255 B2* | 6/2010 | Holt | 280/124.128 |
| 8,002,297 B2* | 8/2011 | Keiserman | 280/124.116 |
| 2003/0146592 A1* | 8/2003 | Chalin et al. | 280/124.116 |
| 2006/0033304 A1* | 2/2006 | Saieg et al. | 280/124.128 |
| 2006/0163834 A1* | 7/2006 | Brereton et al. | 280/124.128 |
| 2008/0224435 A1* | 9/2008 | Holt | 280/124.11 |
| 2009/0224503 A1 | 9/2009 | Richardson | |

* cited by examiner

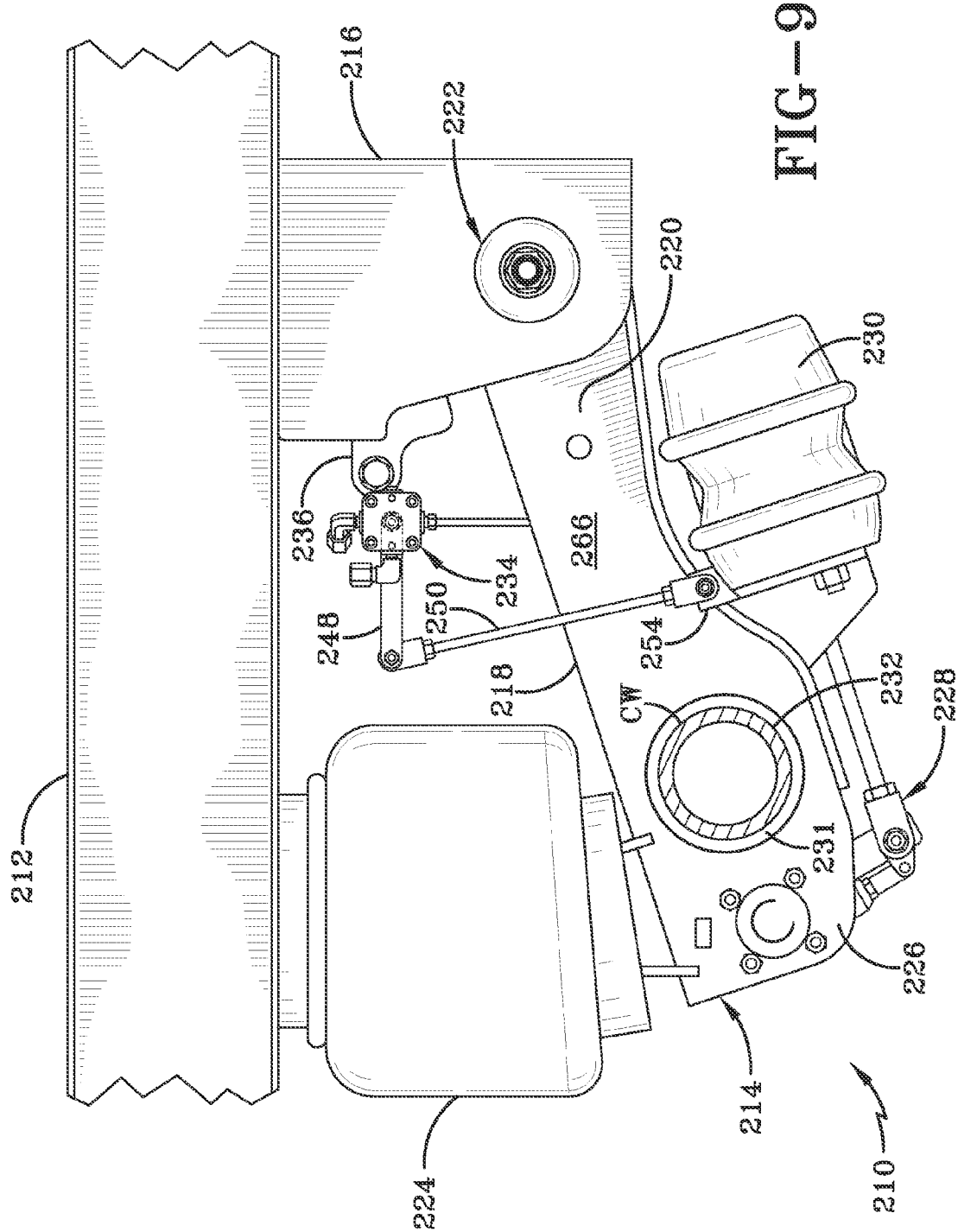

HEAVY-DUTY AXLE/SUSPENSION SYSTEM

CROSS-REFERENCE TO RELATED APPLICATION

This application claims the benefit of U.S. Provisional Patent Application Ser. No. 61/312,304, filed Mar. 10, 2010.

BACKGROUND OF THE INVENTION

1. Field of the Invention

The present invention relates to the art of axle/suspension systems for vehicles. More particularly, the invention relates to the art of trailing or leading arm beam-type air-ride axle/suspension systems for heavy-duty vehicles, such as tractor-trailers or semi-trailers, which cushion the ride and stabilize the vehicle during operation. Still more particularly, the invention relates to an axle/suspension system for gross axle weight rating ("GAWR") applications greater than 23,000 lbs./axle, that incorporates a large diameter axle having a reduced wall thickness and a sleeve disposed about the axle at the axle-to-beam connection. The sleeve has an increased wall thickness as compared to prior art sleeves for large diameter axles, and includes an asymmetrical pair of weld windows generally located at the front and rear portions of the axle. The sleeve windows are positioned between the beam sidewalls, with the inboard and outboard edges of each window being relatively farther from the beam sidewalls than in prior art sleeve windows. The axle/suspension system reduces weight and efficiently reacts loads imparted on the axle/suspension system during operation of the vehicle, while maintaining the desired stiffness and durability of the axle/suspension system.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a primary frame, with the understanding that such reference is by way of example, and that the present invention applies to heavy-duty vehicle axle/suspension systems suspended from primary frames, movable subframes and non-movable subframes.

Specifically, each suspension assembly of an axle/suspension system includes a longitudinally extending elongated beam. Each beam is located adjacent to and below a respective one of a pair of spaced-apart longitudinally extending frame main members. More specifically, each beam is pivotally connected at one of its ends to a hanger which in turn is attached to and depends from a respective one of the frame main members of the vehicle. The beams of the axle/suspension system can either be an overslung/top-mount configuration or an underslung/bottom-mount configuration. For purposes of clarity hereinafter, a beam having an overslung/top-mount configuration shall be referred to as an overslung beam and a beam having an underslung/bottom-mount configuration shall be referred to as an underslung beam. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the frame main members. A brake assembly and shock absorber also are mounted on each of the beams and/or axle. A height control valve is mounted on the hanger or other support structure and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride and stabilize the vehicle. More particularly, as the vehicle is traveling over-the-road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental affect of these forces on the vehicle as it is operating, the axle/suspension system is designed to react or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system.

One type of prior art axle/suspension system and axle-to-beam connection is shown, described and/or claimed in U.S. Pat. No. 5,366,237, and is owned by the assignee of the present invention. This axle/suspension system provides a means for rigidly connecting the axle to the beam through a connection that substantially surrounds the axle, thereby preventing the axle from assuming a cross-sectional configuration substantially different from its manufactured unaltered cross-sectional configuration due to torsional forces. In one embodiment of the invention shown, described and/or claimed in the '237 patent, the means for rigidly connecting the axle to the beam includes an orifice formed in each of the beam sidewalls. Each orifice substantially surrounds both the axle, which extends through the orifices, and a sleeve that substantially surrounds and is rigidly attached to the axle. The sleeve in turn is rigidly attached to the beam through the orifices in the beam. The sleeve includes a pair of windows into which a continuous weld is laid in order to rigidly attach the sleeve to the axle. These windows are located on the front and rear portions of the axle. Moreover, these windows are generally symmetrical with respect to one another in size, shape and orientation relative to the horizontal centerline of the axle at vehicle design ride height, which is the height when the vehicle is not operating. A weld is laid circumferentially around the axle between the sleeve and each beam sidewall at the sidewall orifice in order to rigidly attach the axle to the beam.

Although the structure shown, described and/or claimed in the '237 patent can be used on standard diameter axles, in order to achieve reduced weight of the axle/suspension system it is desirable to utilize an axle having a larger diameter and thinner wall. Such large diameter axles, as they are generally known in the heavy-duty vehicle industry, have an outer diameter of about 5.75 inches as compared to an outer diameter of about 5.0 inches for standard axles. However, for such large diameter axles to be successfully utilized in the axle/suspension system, they must still be capable of meeting certain durability and stiffness requirements as generally defined in the heavy-duty vehicle market. Durability of the axle/suspension system generally refers to the ability of the system to resist wear and tear during operation of the vehicle, thus allowing the axle/suspension system to perform over an extended period of time without exhibiting wear and tear such as fatigue cracking of the welds or cracking of the axle itself during operation of the vehicle. Stiffness generally refers to the rigidity or firmness of the axle and is desirable because stiffness of the axle generally results in a more even distribution of the forces imparted on the axle/suspension system during operation of the vehicle.

Prior art axle/suspension systems utilizing large diameter axles and having relatively thin walls have been utilized successfully for axle/suspension systems having a GAWR of less than or equal to about 23,000 lbs./axle. The GAWR of a given axle/suspension system is determined by the manufacturer of the axle/suspension system and is generally defined as the load carrying capacity of a single axle/suspension system as measured at the tire-ground interfaces. GAWR can vary by manufacturer but GAWR of less than 20,000 lbs./axle, 20,000-23,000 lbs./axle and greater than 23,000 lbs./axle have become relatively standard market segments in the heavy-duty vehicle industry. No known large diameter axle having a relatively thin axle wall thickness has been successfully utilized in an axle/suspension system having a GAWR of greater than 23,000 lbs./axle.

The axle/suspension system of the present invention utilizes a large diameter axle having a relatively thin axle wall, yet the system is capable of maintaining the requisite stiffness and durability for the GAWR greater than 23,000 lbs./axle heavy-duty vehicle market. This desirable result is accomplished by: 1) utilizing a sleeve at the axle-to-beam connection having an increased wall thickness as compared to prior art large diameter axle sleeves; 2) forming and locating the front and rear windows in the axle sleeve with the inboard and outboard edges of each window being relatively farther from the beam sidewalls than in prior art sleeve windows; 3) forming and locating the front and rear windows so that they are asymmetrical with respect to one another in size, shape and/or location, as compared to relevant prior art axle/suspension systems. More specifically, the front window is generally larger and shaped different than the rear window, and the windows are asymmetrically angled with respect to the horizontal centerline of the axle at design ride height. The aforementioned structural changes decrease weight while maintaining durability of the axle/suspension system and maintaining the required stiffness of the axle/suspension system in order to efficiently react the forces imparted on the axle/suspension system during operation of the vehicle.

SUMMARY OF THE INVENTION

Objectives of the present invention include providing an axle/suspension system for GAWR applications greater than 23,000 lbs./axle that includes a large diameter axle and reduces weight of the axle/suspension system.

Another objective of the present invention includes providing an axle/suspension system for GAWR applications greater than 23,000 lbs./axle that includes a large diameter axle and efficiently reacts loads imparted on the axle/suspension during operation of the heavy-duty vehicle.

Yet another objective of the present invention includes providing an axle/suspension system for GAWR applications greater than 23,000 lbs./axle that includes a large diameter axle and maintains the desired stiffness and durability of the axle/suspension system.

These objectives and advantages are obtained by the axle/suspension system of the present invention, which includes a pair of transversely spaced beams. Each one of the beams including an inboard sidewall and an outboard sidewall. An axle extending transversely between and being connected to said beams to form a pair of axle-to-beam connections. Each one of the axle-to-beam connections includes an axle sleeve rigidly connected to the axle. The axle sleeve in turn is rigidly connected to its respective beam. The axle sleeve is formed with at least a front and a rear window. The front window is located generally between the inboard and outboard sidewalls of its respective beam and adjacent a front portion of the axle when the axle is in service and the axle/suspension system is at design ride height. The rear window is located generally between the inboard and outboard sidewalls of its respective beam and adjacent a rear portion of the axle when the axle is in service and the axle/suspension system is at design ride height. The sleeve having a thickness of from about 0.324 inches to about 0.510 inches.

These objectives and advantages are also obtained by the axle/suspension system of the present invention, which includes a pair of transversely spaced beams. Each one of the beams including an inboard sidewall and an outboard sidewall. An axle extending transversely between and being connected to the beams forming a pair of axle-to-beam connections. Each one of the axle-to-beam connections including an axle sleeve rigidly connected to the axle. The axle sleeve in turn rigidly connected to its respective beam. The axle sleeve is formed with at least a front and a rear window. The front window is located generally between the inboard and outboard sidewalls of its respective beam and adjacent a front portion of the axle when the axle is in service and the axle/suspension system is at design ride height. The rear window is located generally between the inboard and outboard sidewalls of its respective beam and adjacent a rear portion of the axle when the axle is in service and the axle/suspension system is at design ride height. The first and second windows are generally asymmetrically angled with respect to a horizontal centerline of the axle when the axle is in service and the axle/suspension system is at design ride height.

BRIEF DESCRIPTION OF THE SEVERAL VIEWS OF THE DRAWINGS

The preferred embodiments of the invention, illustrative of the best modes in which applicant(s) have contemplated applying the principles of the invention, are set forth in the following description and are shown in the drawings, and are particularly and distinctly pointed out and set forth in the appended claims.

FIG. 9 is a fragmentary elevational view of a first preferred embodiment axle/suspension system of the present invention having a GAWR of greater than 23,000 lbs./axle and incorporating a 5.75 inch large diameter axle, showing one of the suspension assemblies of the axle/suspension system including the large diameter axle in section surrounded by and rigidly attached to a sleeve which in turn is surrounded by and rigidly attached to a trailing arm overslung beam of the suspension assembly;

Similar numerals refer to similar parts throughout the drawings.

DESCRIPTION OF THE PREFERRED EMBODIMENT

Figure 1:
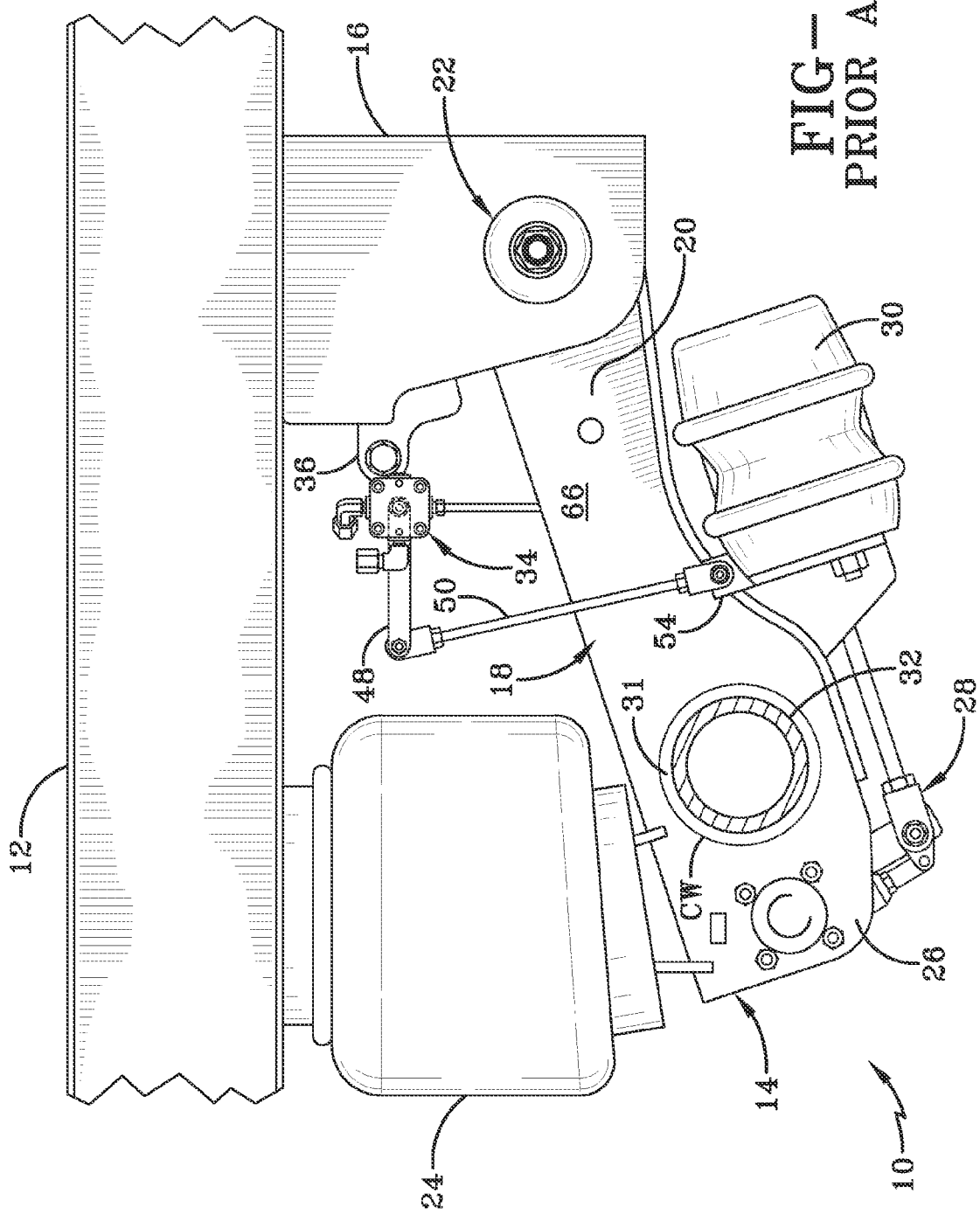
FIG. 1 is a fragmentary elevational view of a prior art axle/suspension system having a GAWR of about 25,000 lbs./axle and incorporating a standard size axle, showing one of the suspension assemblies of the axle/suspension system including the 5.0 inch standard size axle in section surrounded by and rigidly attached to a sleeve which in turn is surrounded by and rigidly attached to a trailing arm overslung beam of the suspension assembly.

In order to better understand the axle/suspension system of the present invention, a prior art trailing arm overslung beam-type air-ride axle/suspension system that incorporates a standard size axle having an outside diameter of about 5.0 inches and which has a GAWR of about 25,000 lbs./axle, is indicated generally at 10, is shown in FIG. 1 mounted on a main member 12 of a heavy-duty vehicle (not shown), and now will be described.

It should be noted that main member 12 is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, main member 12 is shown in FIG. 1 as a primary frame. Moreover, because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, trailing arm beam 18 includes a front end 20 having a bushing assembly 22, which includes a bushing, pivot bolts and washers as are well known in the art and will be described below, to facilitate pivotal connection of the beam to hanger 16. Beam 18 also includes a rear end 26, which is welded or otherwise rigidly attached to a transversely-extending axle 32. Axle 32 is a standard axle having an outer diameter of about 5.0 inches. A sleeve 31 is disposed about axle 32 between the axle and beam 18. Sleeve 31 has a thickness of about 0.448 inches. A circumferential weld (not shown) is laid around axle 32 at a junction CW between sleeve 31 and each of a pair of sidewalls 66 (FIGS. 3 and 4) of beam 18.

Suspension assembly 14 also includes an air spring 24, mounted on and extending between rear end 26 of beam 18 and main member 12. A height control valve 34 is mounted on hanger 16 via a bracket 36 in a manner well known to those having skill in the art. Height control valve 34 includes a lever 48 that is attached to beam 18 via a link 50 and a bracket 54. For the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 and a shock absorber (not shown) also assist in cushioning the ride for cargo and passengers.

Figure 2:
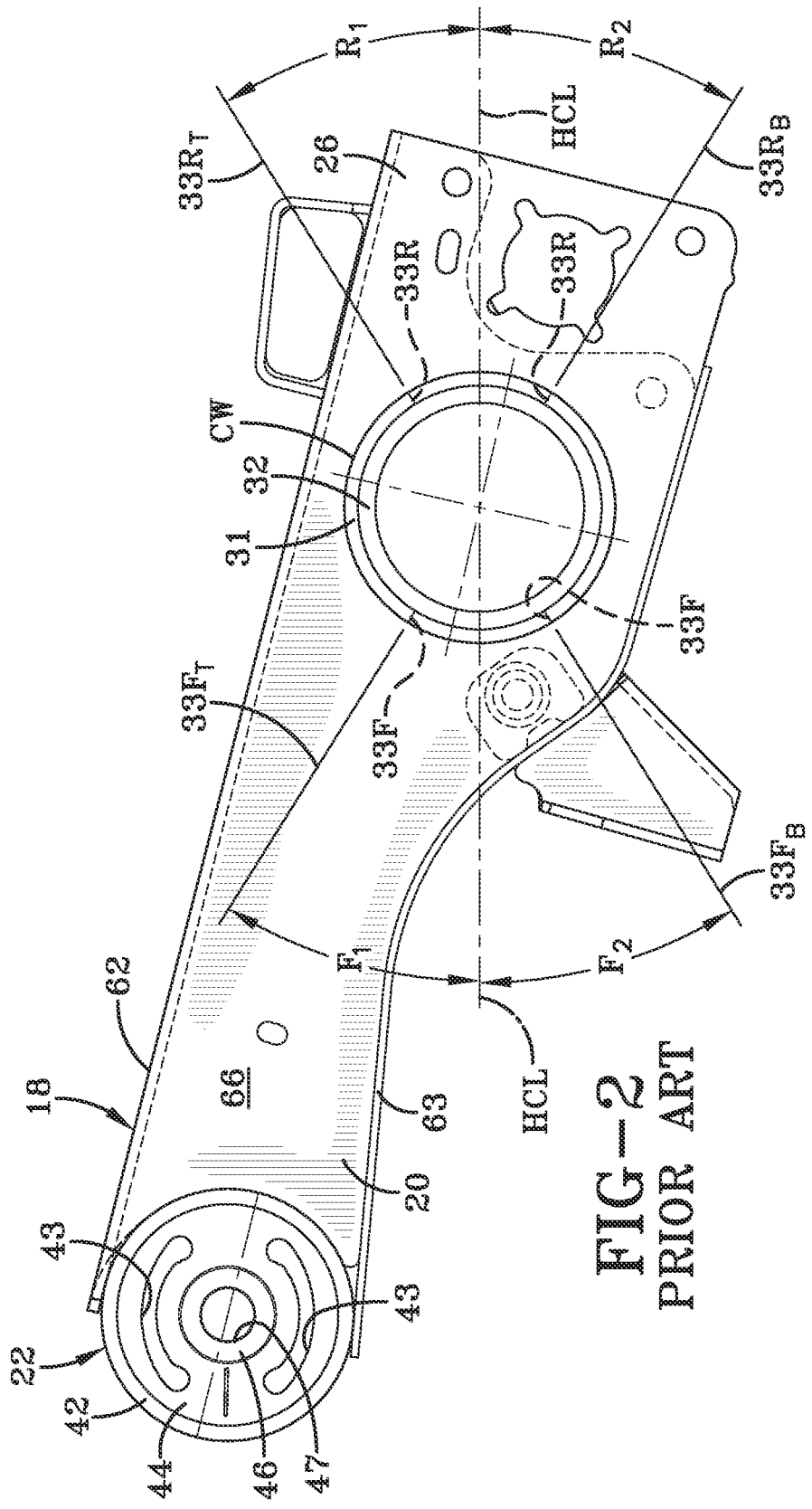
FIG. 2 is an enlarged elevational view of the suspension assembly beam shown in FIG. 1, with hidden portions represented by broken lines, showing the location of the sleeve windows relative to the axle, with the windows being positioned symmetrically relative to the front and rear portions of the axle and the horizontal centerline of the axle at vehicle design ride height.
Figure 3:
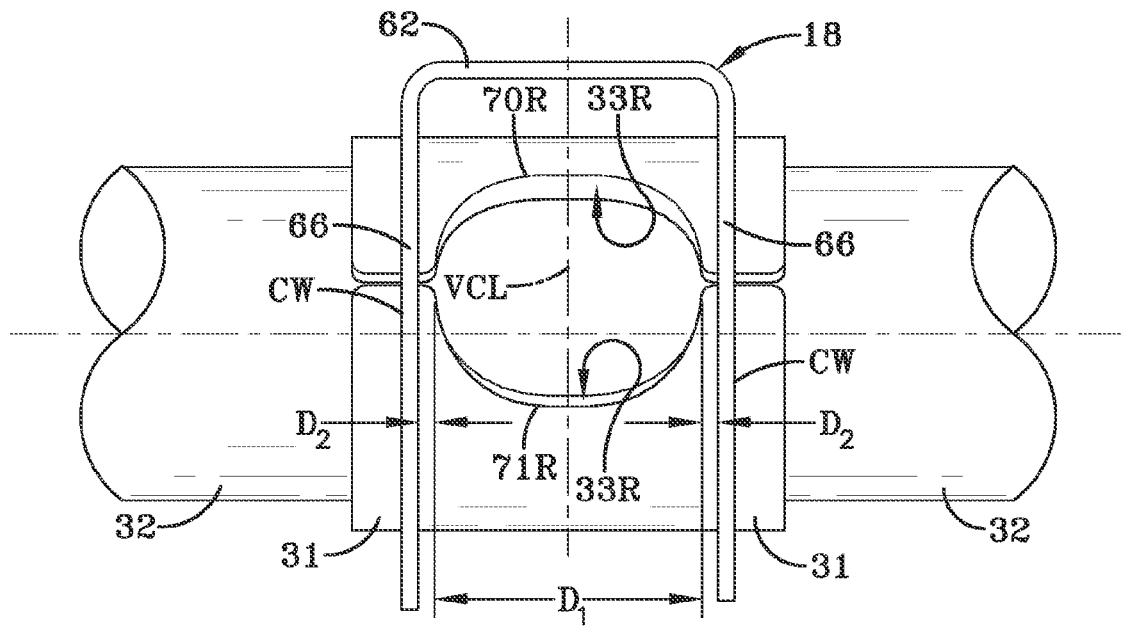
FIG. 3 is a greatly enlarged fragmentary rear elevational view of the axle-to-beam connection of the prior art beam shown in FIG. 2, showing the rear window formed in the sleeve.
Figure 4:
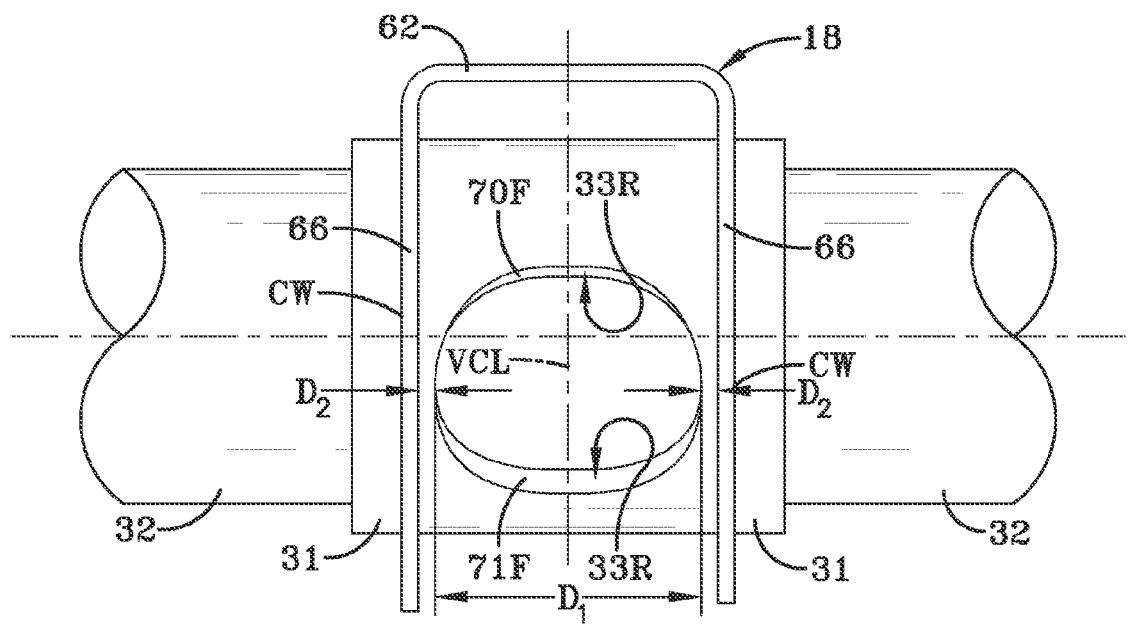
FIG. 4 is a greatly enlarged fragmentary front elevational view of the axle-to-beam connection of the prior art beam shown in FIG. 2, showing the front window formed in the sleeve.

Turning now to FIG. 2, overslung beam 18 is shown generally oriented to design ride height of the vehicle. Beam 18 includes sidewalls 66 integrally formed with a top plate 62 in a generally inverted U-shape (FIGS. 3 and 4). A bottom plate 63 is attached to the bottom portions of sidewalls 66 opposite top plate 62. Front end 20 of beam 18 includes bushing assembly 22 of a type which is well known in the heavy-duty axle/suspension system art. More particularly, bushing assembly 22 includes a mounting tube 42 formed of robust steel and an elastomeric bushing 44 press fit into the tube. Bushing 44 is molded about and adhesively attached to a central metal sleeve 46 formed with a continuous opening 47. Bushing sleeve 46 passes completely through bushing 44 and extends outwardly from the sidewalls thereof to facilitate pivotal mounting of beam 18 on hanger 16, which is described above. As is well known in the art, the durometer of elastomeric bushing 44 can be varied depending on the application and the bushing deflection properties desired. To generally achieve a softer ride in the vertical direction and a stiller ride in the fore-aft direction, bushing 44 is formed with a pair of vertically-spaced voids 43 in each of its sidewalls.

With continuing reference to FIG. 2 and additional reference to FIGS. 3 and 4, axle 32 is shown surrounded by sleeve 31. A front window 33F is formed in sleeve 31 adjacent the front portion of axle 32. A rear window 33R is formed in sleeve 31 adjacent the rear portion of axle 32. A horizontal centerline HCL is shown bisecting axle 32 and defines the horizontal centerline of the axle when the vehicle is at design ride height, which is well known to those having ordinary skill in the art. A pair of lines $33F_T$ and $33F_B$ extend generally frontwardly from sleeve 31 and align with a top and a bottom edge 70F, 71F, respectively, and a vertical centerline VCL (FIG. 4) of front window 33F, to form angles $F_1$ and $F_2$, respectively, relative to horizontal centerline HCL, where the values of $F_1$ and $F_2$ are each about 37°. Likewise, a pair of lines $33R_T$ and $33R_B$ extend generally rearwardly from sleeve 31 and align with a top and a bottom edge 70R, 71R, respectively, and vertical centerline VCL (FIG. 3) of rear window 33R to form angles $R_1$ and $R_2$, respectively, relative to horizontal centerline HCL, where the values of $R_1$ and $R_2$ are each about 37°. Therefore, front window 33F and rear window 33R are formed in sleeve 31 so that they are symmetrical in size and shape. In addition, front and rear windows 33F,R, respectively, are formed in sleeve 31 so that they are symmetrically angled with respect to horizontal centerline HCL at design ride height of the vehicle.

Rear window 33R (FIG. 3) is shown formed in sleeve 31 which is disposed around and attached to axle 32 by a continuous weld (not shown) laid around the window in a manner well known to those skilled in the art. Rear window 33R has a width $D_1$ of about 4.0 inches. Moreover, rear window 33R is located so that the inboard and outboard edges of the window are each a distance $D_2$ from its respective sidewall 66 interior surface of beam 18, where $D_2$ is equal to about 0.25 inches.

Turning now to FIG. 4, front window 33F is shown formed in sleeve 31 which is disposed about and attached to axle 32 by a continuous weld (not shown) laid along the window in a manner well known to those skilled in the art. Front window 33F has a width $D_1$ of about 4.0 inches. Moreover, front window 33F is located so that the inboard and outboard edges of the window are each a distance $D_2$ from its respective sidewall 66 interior surface of beam 18, where $D_2$ is equal to about 0.25 inches.

Figure 5:
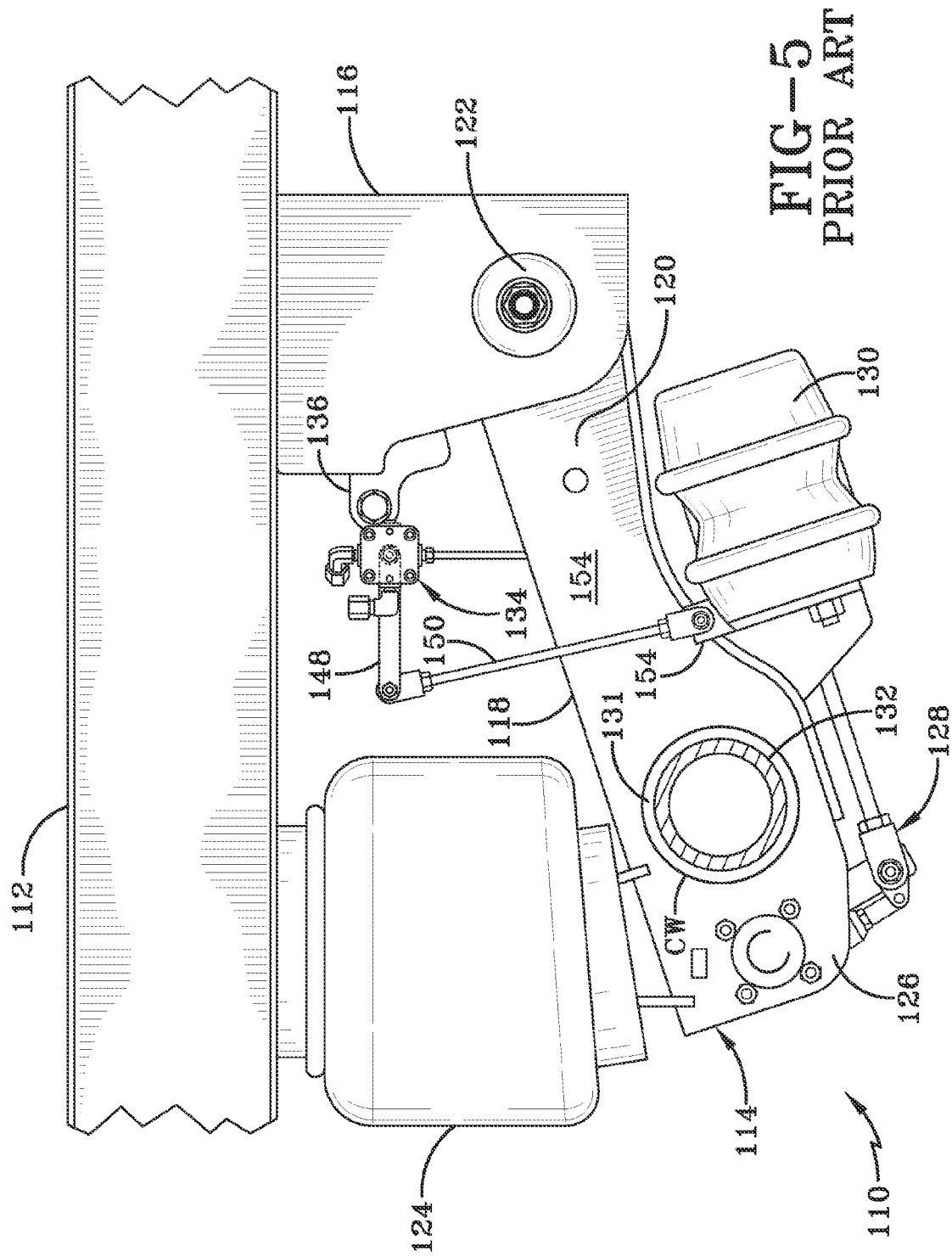
FIG. 5 is a fragmentary elevational view of a prior art axle/suspension system having a GAWR of about 23,000 lbs./axle incorporating a 5.75 inch large diameter axle, showing one of the suspension assemblies and the large diameter axle in section surrounded by and rigidly attached to a sleeve which in turn is surrounded by and rigidly attached to a tapered trailing arm overslung beam of the suspension assembly.

A prior art trailing arm overslung beam type air-ride axle/suspension system that incorporates a large diameter axle having an outside diameter of about 5.75 inches and which has a GAWR of about 23,000 lbs./axle, is indicated generally at 110, is shown in FIG. 5 mounted on a main member 112 of a heavy-duty vehicle (not shown), and now will be described.

It should be noted that main member 112 is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, main member 112 is shown in FIG. 5 as a primary frame. Moreover, because axle/suspension system 110 generally includes an identical pair of suspension assemblies 114, for sake of clarity only one of the suspension assemblies will be described below.

Suspension assembly 114 is pivotally connected to hanger 116 via a trailing arm overslung tapered beam 118. More specifically, trailing arm beam 118 includes a front end 120 having a bushing assembly 122, which includes a bushing, pivot bolts and washers as are well known in the art and will be described below, to facilitate pivotal connection of the beam to hanger 116. Tapered beam 118 also includes a rear end 126, which is welded or otherwise rigidly attached to a transversely-extending axle 132. Axle 132 is a large diameter axle having an outer diameter of about 5.75 inches and an axle wall thickness of about 0.310 inches. A sleeve 131 is disposed about axle 132 between the axle and beam 118. Sleeve 131 has a thickness of about 0.323 inches. A circumferential weld (not shown) is laid around axle 132 at a junction CW between sleeve 131 and each of a pair of sidewalls 166 (FIGS. 7 and 8) of beam 118.

Suspension assembly 114 also includes an air spring 124 mounted on and extending between rear end 126 of beam 118 and main member 112. A height control valve 134 is mounted on hanger 116 via a bracket 136 in a manner well known to those having skill in the art. Height control valve 134 includes a lever 148 that is attached to beam 118 via a link 150 and a bracket 154. For the sake of relative completeness, a brake system 128 including a brake chamber 130 is shown mounted on prior art suspension assembly 114.

As mentioned above, axle/suspension system 110 is designed to absorb forces that act on the vehicle as it is operating. More particularly, it is desirable for axle/suspension system 110 to be rigid or stiff in order to resist roll forces and thus provide roll stability for the vehicle. This is typically accomplished by using beam 118, which is rigid, and also is rigidly attached to axle 132. It is also desirable, however, for axle/suspension system 110 to be flexible to assist in cushioning the vehicle (not shown) from vertical impacts and to provide compliance so that the axle/suspension system resists failure. Such flexibility typically is achieved through the pivotal connection of beam 118 to hanger 116 with bushing assembly 122. Air spring 124 and a shock absorber (not shown) also assist in cushioning the ride for cargo and passengers.

Figure 6:
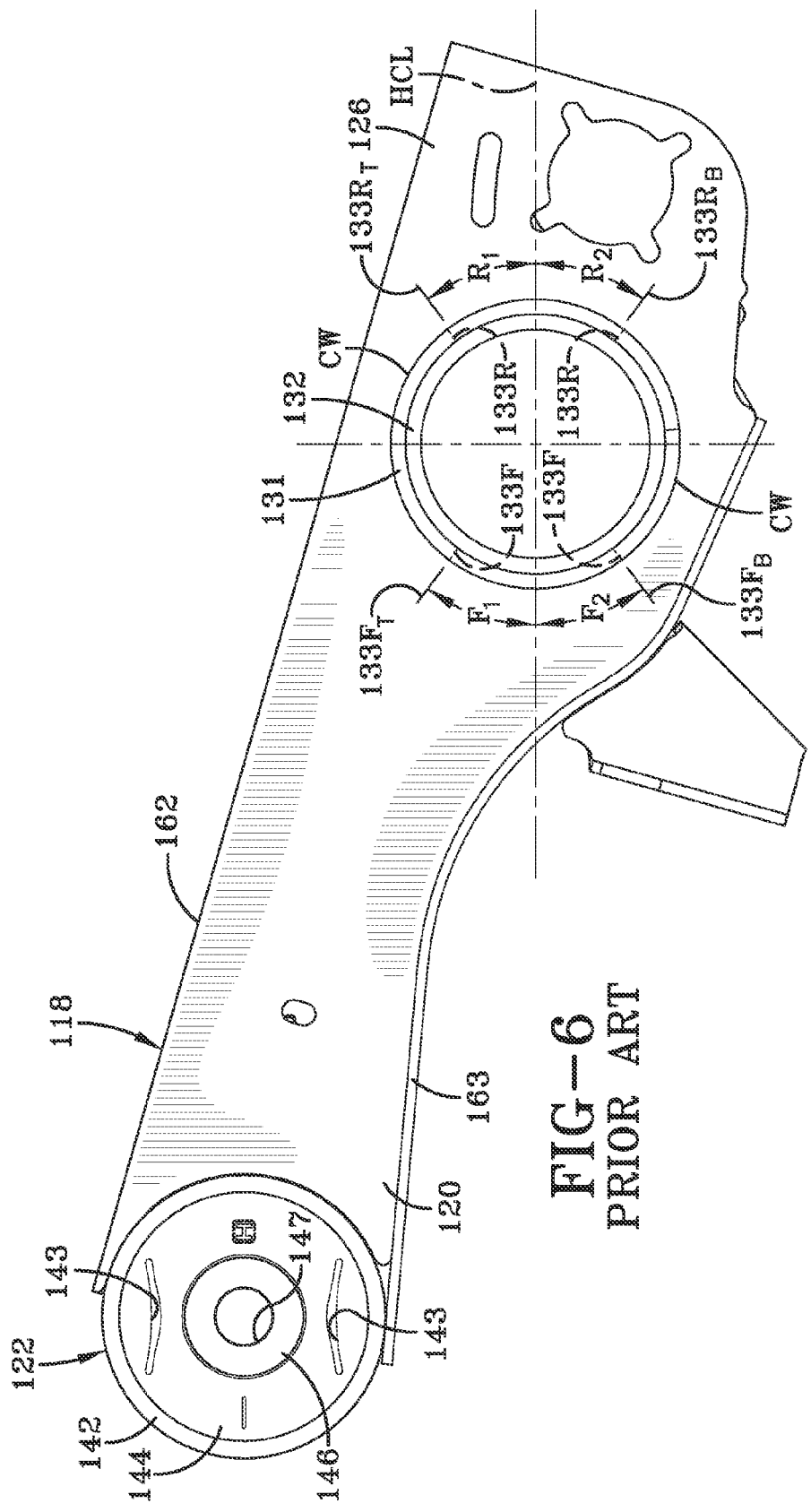
FIG. 6 is an enlarged fragmentary elevational view of the suspension assembly beam shown in FIG. 5, with hidden portions represented by broken lines, showing the location of the front and rear sleeve windows relative to the axle, with the front and rear windows being positioned symmetrically relative to the front and rear portions of the axle and the horizontal centerline of the axle at vehicle design ride height.

Turning now to FIG. 6, overslung tapered beam 118 is shown generally oriented to design ride height of the vehicle. Beam 118 includes sidewalls 166 (FIGS. 7 and 8) integrally formed with a top plate 162 in a generally inverted U-shape. A bottom plate 163 is attached to the bottom portions of sidewalls 166 opposite top plate 162. Front end 120 of beam 118 includes bushing assembly 122 of a type which is well known in the heavy-duty axle/suspension system art. More particularly, bushing assembly 122 includes a mounting tube 142 formed of robust steel and an elastomeric bushing 144 press fit into the tube. Bushing 144 is molded about and adhesively attached to a central metal sleeve 146 formed with a continuous opening 147. Bushing sleeve 146 passes completely through bushing 144 and extends outwardly from the sidewalls thereof to facilitate pivotal mounting of beam 118 on hanger 116, which is described above. As is well known in the art, the durometer of elastomeric bushing 144 can be varied depending on the application and the bushing deflection properties desired. To generally achieve a softer ride in the vertical direction and a stiffer ride in the fore-aft direction, bushing 144 is formed with a pair of vertically-spaced voids 143 in each of its sidewalls.

Figure 7:
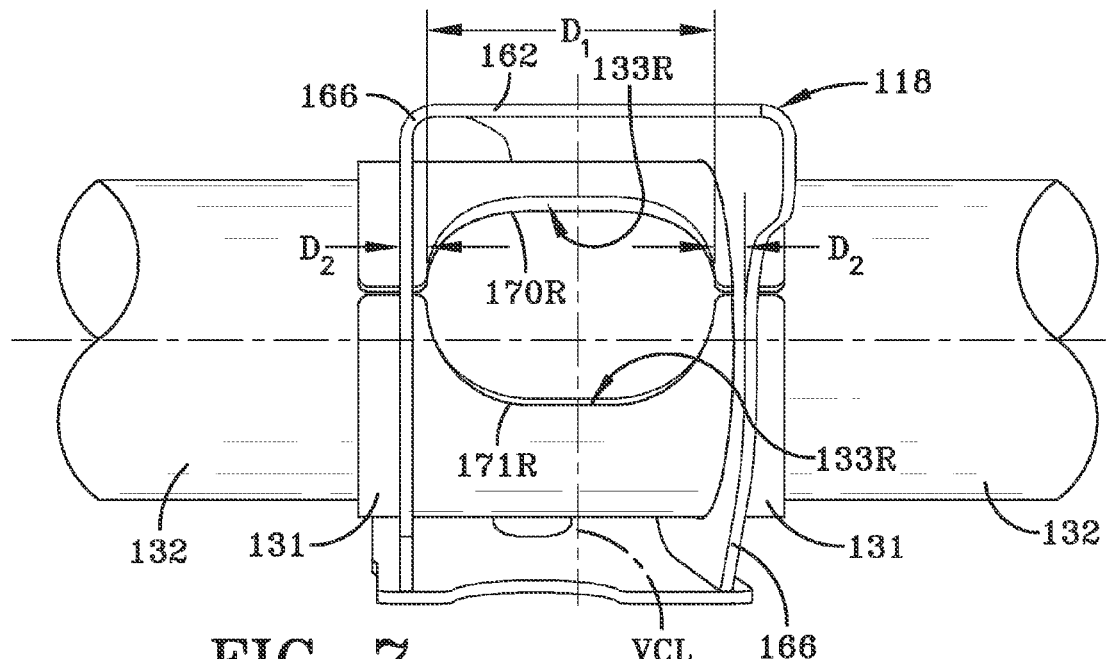
FIG. 7 is an enlarged fragmentary rear elevational view of the axle-to-beam connection of the prior art beam shown in FIG. 5, showing the rear window formed in the sleeve.
Figure 8:
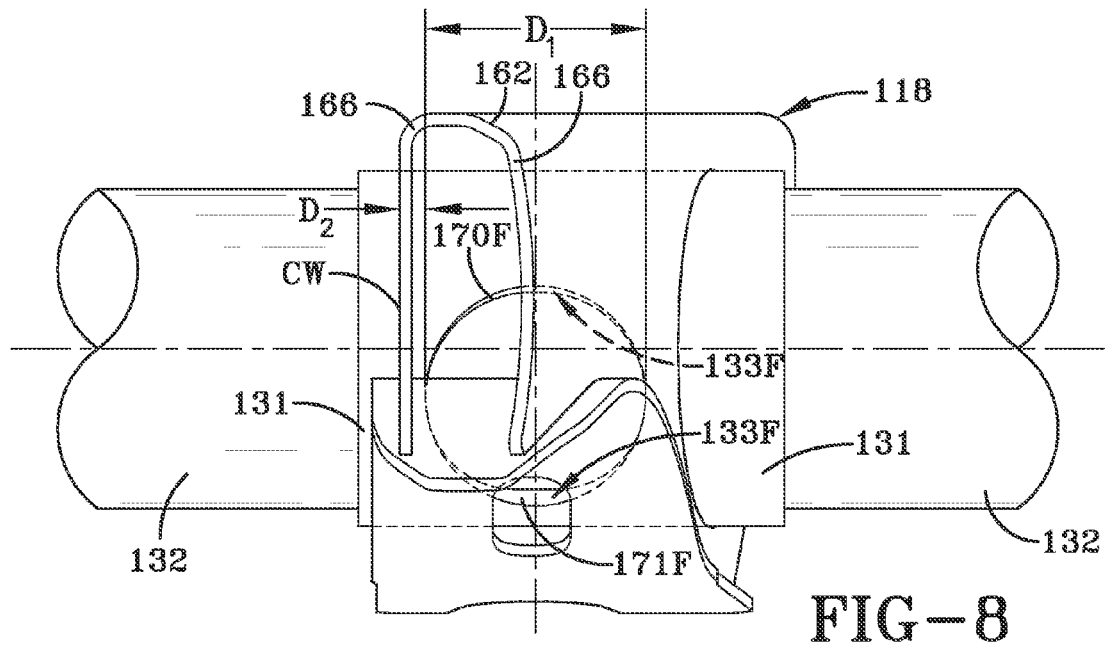
FIG. 8 is a greatly enlarged fragmentary front elevational view of the axle-to-beam connection of the prior art beam shown in FIG. 5 with hidden portions represented by broken lines, showing the front window formed in the sleeve.

With continuing reference to FIG. 6 and with additional reference to FIGS. 7 and 8, axle 132 is shown surrounded by sleeve 131. A front window 133F is formed in sleeve 131 adjacent the front portion of axle 132. A rear window 133R is formed in sleeve 131 adjacent the rear portion of axle 132. A horizontal centerline HCL is shown bisecting axle 132 and defines the horizontal centerline of the axle when the vehicle is at design ride height. A pair of lines $133F_T$ and $133F_B$ extend generally frontwardly from sleeve 131 and align with a top and a bottom edge 170F, 171F, respectively, and a vertical centerline VCL (FIG. 8) of front window 133F, to form angles $F_1$ and $F_2$, respectively, relative to horizontal centerline HCL, where the values of $F_1$ and $F_2$ are each about 37°. Likewise, a pair of lines $133R_T$ and $133R_B$ extend generally rearwardly from sleeve 131 and align with a top and a bottom edge 170R, 171R, respectively, and vertical centerline VCL (FIG. 7) of rear window 133R to form angles $R_1$ and $R_2$, respectively, relative to horizontal centerline HCL, where the values of $R_1$ and $R_7$ are each about 37°. Therefore, front window 133F and rear window 133R are formed in sleeve 131 so that they are symmetrically angled with respect to horizontal centerline HCL at design ride height of the vehicle.

Rear window 133R (FIG. 7) is shown formed in sleeve 131 which is disposed around and attached to axle 132 by a continuous weld (not shown) laid around the window in a manner well known to those skilled in the art. Rear window 133R has a width $D_1$ of about 5.2 inches. Moreover, rear window 133R is located so that the inboard and outboard edges of the window are each a distance $D_2$ from its respective sidewall 166 interior surface of beam 118, where $D_2$ is equal to about 0.26 inches from the interior surface of the outboard sidewall and about 0.32 inches from the interior surface of the inboard sidewall.

Turning now to FIG. 8, front window 133F is shown formed in sleeve 131 which is disposed about and attached to axle 132 by a continuous weld (not hown) laid along the window in a manner well known to those skilled in the art. Front window 133F has a width $D_1$ of about 4.0 inches. Moreover, front window 133F is located so that the inboard and outboard edges of the window are each a distance $D_2$ from its respective sidewall 166 interior surface of beam 118, where $D_2$ is equal to about 0.25 inches from the interior surface of the outboard sidewall and about 0.32 inches from the interior surface of the inboard sidewall.

Figure 8A:
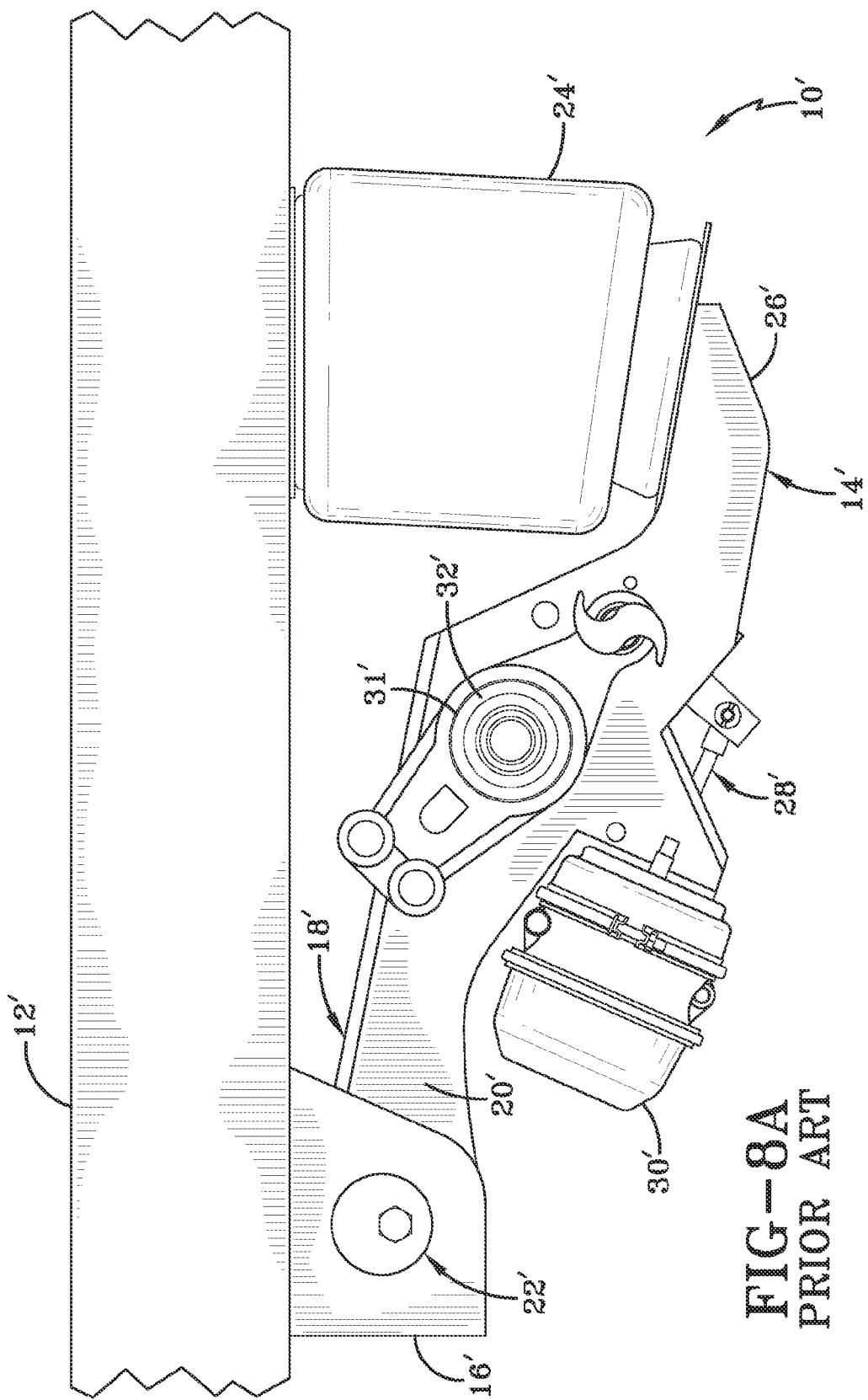
FIG. 8A is a fragmentary elevational view of a prior art axle/suspension system having a GAWR of about 25,000 lbs./axle and incorporating a standard size axle, showing one of the underslung suspension assemblies of the axle/suspension system including the 5.0 inch standard size axle surrounded by and rigidly attached to a sleeve which in turn is surrounded by and rigidly attached to a trailing arm underslung beam of the suspension assembly.

In order to understand the axle/suspension system of the present invention, yet another prior art trailing arm beam-type air-ride axle/suspension system that incorporates a standard size axle having an outside diameter of about 5.0 inches and which has a GAWR of about 25,000 lbs./axle, and which includes an underslung beam is indicated generally at 10', is shown in FIG. 8A mounted on a main member 12' of a heavy-duty vehicle (not shown), and now will be described.

It should be noted that main member 12' is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, main member 12' is shown in FIG. 8A as a primary frame. Moreover, because axle/suspension system 10' generally includes an identical pair of suspension assemblies 14', for the sake of clarity only one of the suspension assemblies will be described below.

Suspension assembly 14' is pivotally connected to a hanger 16' via a tapered trailing arm underslung beam 18'. More specifically, trailing arm beam 18' includes a front end 20' having a bushing assembly 22', which includes a bushing, pivot bolts and washers as are well known in the art and will be described below, to facilitate pivotal connection of the beam to hanger 16'. Beam 18' also includes a rear end 26', which is welded or otherwise rigidly attached to a transversely-extending axle 32'. Axle 32' is a standard axle having an outer diameter of about 5.0 inches. A sleeve 31' is disposed about axle 32' between the axle and beam 18'. Sleeve 31' has a thickness of about 0.448 inches. A circumferential weld (not shown) is laid around axle 32' at a junction CW' between sleeve 31' and each of a pair of sidcwalls 66' (FIGS. 8B-8D) of beam 18'.

Suspension assembly 14' also includes an air spring 24', mounted on and extending between a top plate 27' of rear end 26' of beam 18' and main member 12'. For the sake of relative completeness, a brake system 28' including a brake chamber 30' is shown mounted on prior art suspension assembly 14'.

As mentioned above, axle/suspension system 10' is designed to absorb forces that act on the vehicle as it is operating. More particularly, it is desirable for axle/suspension system 10' to be rigid or stiff in order to resist roll forces and thus provide roll stability for the vehicle. This is typically accomplished by using beam 18', which is rigid, and also is rigidly attached to axle 32'. It is also desirable, however, for axle/suspension system 10' to be flexible to assist in cushioning the vehicle (not shown) from vertical impacts and to provide compliance so that the axle/suspension system resists failure. Such flexibility typically is achieved through the pivotal connection of beam 18' to hanger 16' with bushing assembly 22'. Air spring 24' and a shock absorber (not shown) also assist in cushioning the ride for cargo and passengers.

Figure 8B:
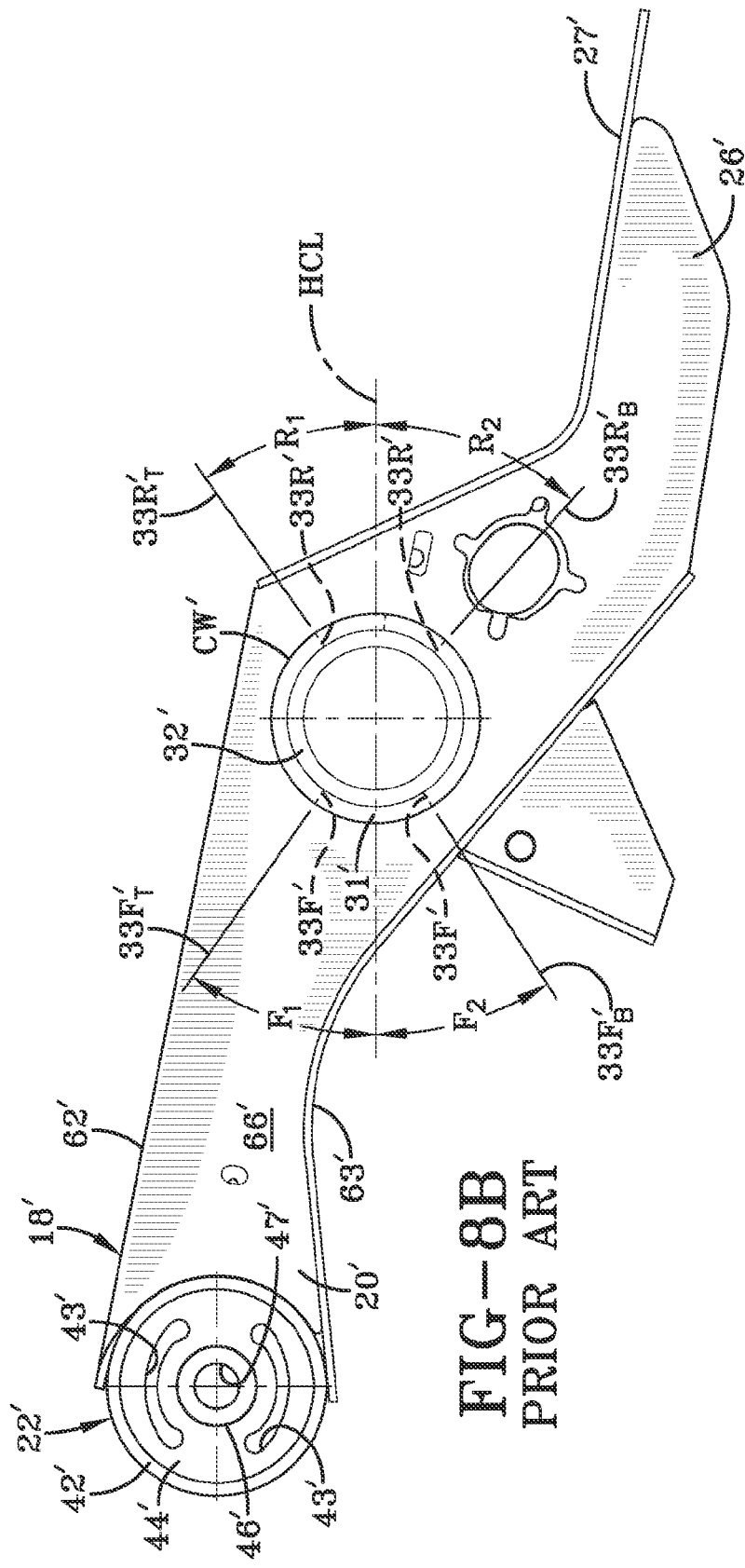
FIG. 8B is an enlarged elevational view of the suspension assembly beam shown in FIG. 8A, with hidden portions represented by broken lines, showing the location of the sleeve windows relative to the axle and the horizontal centerline of the axle at vehicle design ride height.
Figure 8C:
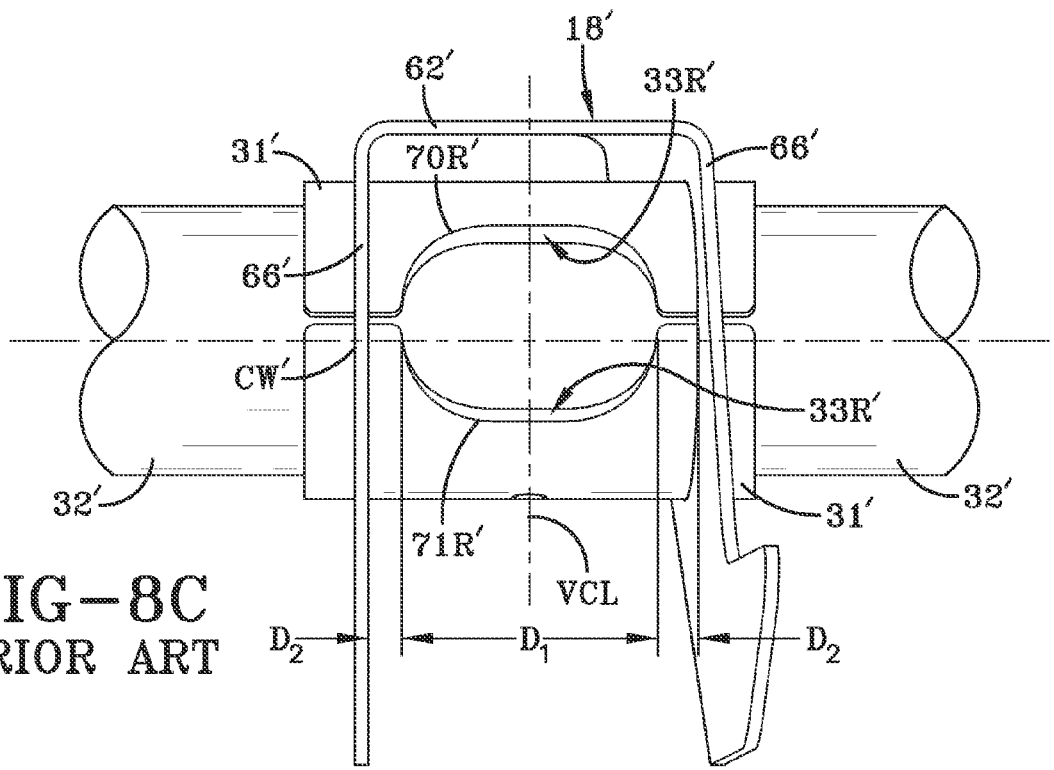
FIG. 8C is a greatly enlarged fragmentary rear elevational view of the axle-to-beam connection of the prior art beam shown in FIG. 8B, showing the rear window formed in the sleeve.
Figure 8D:
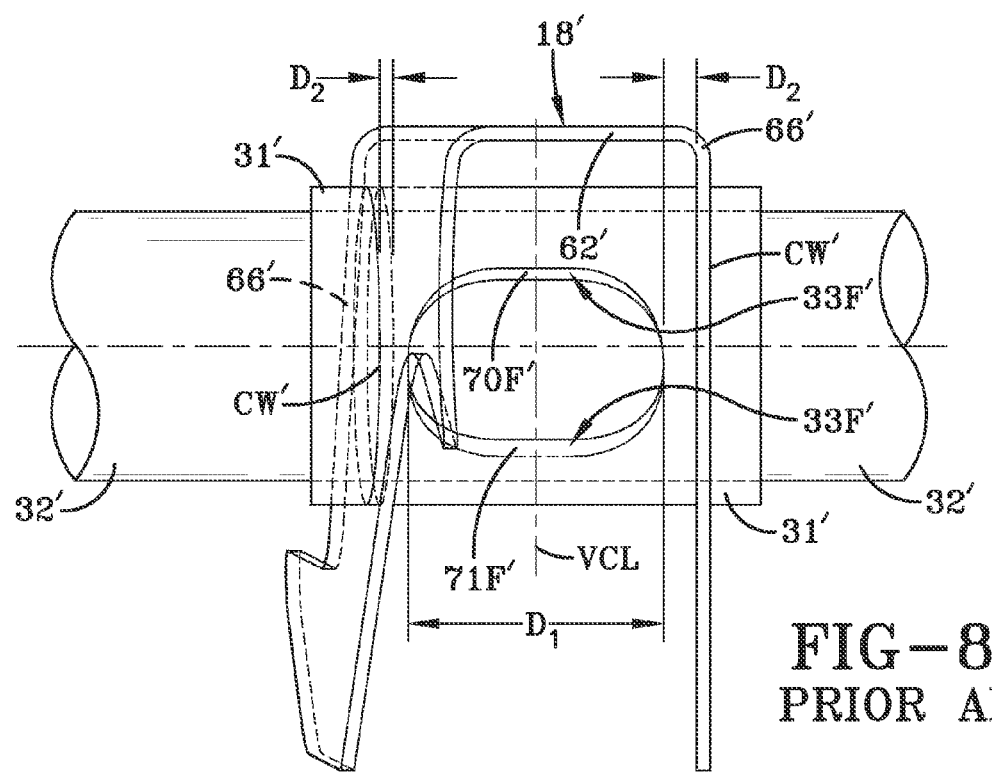
FIG. 8D is a greatly enlarged fragmentary front elevational view of the axle-to-beam connection of the prior art beam shown in FIG. 8B, showing the front window formed in the sleeve.

Turning now to FIG. 8B, beam 18' is shown generally oriented to design ride height of the vehicle. Beam 18' includes sidewalls 66' integrally formed with a top plate 62' in a generally inverted U-shape (FIGS. 8C and 8D). A bottom plate 63' is attached to the bottom portions of sidewalls 66' opposite top plate 62'. Front end 20' of beam 18' includes bushing assembly 22' of a type which is well known in the heavy-duty axle/suspension system art. More particularly, bushing assembly 22' includes a mounting tube 42' formed of robust steel and an elastomeric bushing 44' press fit into the tube. Bushing 44' is molded about and adhesively attached to a central metal sleeve 46' formed with a continuous opening 47'. Bushing sleeve 46' passes completely through bushing 44' and extends outwardly from the sidewalls thereof to facilitate pivotal mounting of beam 18' on hanger 16', which is described above. As is well known in the art, the durometer of elastomeric bushing 44' can be varied depending on the application and the bushing deflection properties desired. To generally achieve a softer ride in the vertical direction and a stiffer ride in the fore-aft direction, bushing 44' is formed with a pair of vertically-spaced voids 43' in each of its sidewalls.

With continuing reference to FIG. 8B and additional reference to FIGS. 8C and 8D, axle 32' is shown surrounded by sleeve 31'. A front window 33F' is formed in sleeve 31' adjacent the front portion of axle 32'. A rear window 33R' is formed in sleeve 31' adjacent the rear portion of axle 32'. A horizontal centerline HCL is shown bisecting axle 32' and defines the horizontal centerline of the axle when the vehicle is at design ride height, which is well known to those having ordinary skill in the art. A pair of lines $33F_T'$ and $33F_B'$ extend generally frontwardly from sleeve 31' and align with a top and a bottom edge 70F', 71F', respectively, and a vertical centerline VCL (FIG. 8D) of front window 33F', to form angles $F_1$ and $F_2$, respectively, relative to horizontal centerline HCL, where the values of $F_1$ and $F_2$ are about 41° and 33°, respectively. Likewise, a pair of lines $33R_T'$ and $33R_B'$ extend generally rearwardly from sleeve 31' and align with a top and a bottom edge 70R', 71R', respectively, and vertical centerline VCL (FIG. 8C) of rear window 33R' to form angles $R_1$ and $R_2$, respectively, relative to horizontal centerline HCL, where the values of $R_1$ and $R_2$ are about 35° and 42°, respectively.

Rear window 33R' (FIG. 8C) is shown formed in sleeve 31' which is disposed around and attached to axle 32' by a continuous weld (not shown) laid around the window in a manner well known to those skilled in the art. Rear window 33R' has a width $D_1$ of about 4.75 inches. Moreover, rear window 33R' is located so that the inboard and outboard edges of the window are each a distance $D_2$ from its respective sidewall 66' interior surface of beam 18', where $D_2$ is equal to about 0.62 inches from the interior surface of the outboard sidewall and about 0.77 inches from the interior surface of the inboard sidewall.

Turning now to FIG. 8D, front window 33F' is shown formed in sleeve 31' which is disposed about and attached to axle 32' by a continuous weld (not shown) laid along the window in a manner well known to those skilled in the art. Front window 33F' has a width $D_1$ of about 4.76 inches. Moreover, front window 33F' is located so that the inboard and outboard edges of the window are each a distance $D_2$ from its respective sidewall 66' interior surface of beam 18', where $D_2$ is equal to about 0.62 inches from the interior surface of the outboard sidewall and about 0.27 inches from the interior surface of the inboard sidewall.

Prior art axle/suspension systems 10 and 10' having a GAWR of about 25,000 lbs./axle utilize a standard size axle having an outside diameter of about 5.0 inches. Axle/suspension systems 10 and 10' react loads efficiently, but because they utilize a standard size axle with a wall thickness of about 0.562 inches they are heavy and, therefore, limit the amount of cargo that can be carried by the heavy-duty vehicle. Moreover, it would not be possible to simply make the standard size axles with thinner walls in order to reduce the weight of the axle/suspension systems because the systems would not have the desired stiffness for the heavy-duty vehicle industry.

In comparison and contrast, prior art axle/suspension system 110 having a GAWR of about 23,000 lbs./axle utilizes a large diameter axle having an outside diameter of about 5.75 inches. While it is lighter due to having a reduced axle wall thickness of about 0.310 inches, axle/suspension system 110 still reacts loads efficiently, however, the structural design of the system cannot be utilized on axle/suspension systems having a GAWR of greater than 23,000 lbs./axle. This is because the large diameter axle utilized in axle/suspension system 110 does not provide the required durability necessary for applications having GAWR of greater than 23,000 lbs./axle, and especially durability in the window welds used to attach sleeve 131 to axle 132 and the circumferential welds used to attach the sleeve to beam 118.

The present invention successfully incorporates a lightweight large diameter axle into an axle/suspension system having a GAWR of greater than 23,000 lbs./axle. More specifically, the present invention saves weight by utilizing a larger diameter axle with a relatively thin axle wall, yet still provides the requisite stiffness required in the industry. In addition, the requisite durability of the axle/suspension system required in the industry is maintained by increasing the thickness of the sleeve, increasing the distance between the sleeve windows and the beam sidewalls, and by forming and locating the front and rear windows asymmetrically with respect to each other and the horizontal centerline of the axle at design ride height. A detailed description of the axle/suspension system of the present invention is set forth below.

A first preferred embodiment of an axle/suspension system of the present invention having a GAWR of at least about greater than 23,000 lbs./axle and incorporating a large diameter axle 232, is shown generally at 210 in FIG. 9, and will now be described below. Axle/suspension system 210 of the present invention is similar in some respects to prior art axle/suspension systems 10, 10' and 110 described above, but is different in other respects.

Axle/suspension system 210 of the present invention is shown mounted on a main member 212 of the frame of a heavy-duty vehicle (not shown). It should be noted that main member 212 is generally representative of various types of frames used for heavy-duty vehicles, including primary frames that do not support a subframe and primary frames and/or floor structures that do support a subframe. For primary frames and/or floor structures that do support a sub frame, the subframe can be non-movable or movable, the latter being commonly referred to as a slider box. For the purpose of convenience, main member 212 is shown in FIG. 9 as a primary frame. Moreover, because axle/suspension system 210 generally includes an identical pair of suspension assemblies 214, for sake of clarity only one of the suspension assemblies will be described below.

Suspension assembly 214 is pivotally connected to hanger 216 via a trailing arm overslung beam 218. More specifically, trailing arm beam 218 includes a front end 220 having a bushing assembly 222, which includes a bushing, pivot bolts and washers as are well known in the art and will be described below, to facilitate pivotal connection of the beam to hanger 216. Beam 218 also includes a rear end 226, which is welded or otherwise rigidly attached to transversely-extending axle 232. Axle 232 is a large diameter axle having an outer diameter of about 5.75 inches and a wall thickness of about 0.367 inches. A sleeve 231 is disposed about axle 232 between the axle and beam 218. Sleeve 231 has a thickness of about 0.385 inches. A circumferential weld (not shown) is laid around axle 232 at a junction CW between sleeve 231 and each of a pair of sidewalls 266 (FIGS. 10 and 11) of beam 218.

Suspension assembly 214 also includes an air spring 224, mounted on and extending between rear end 226 of beam 218 and main member 212. A height control valve 234 is mounted on hanger 216 via a bracket 236 in a manner well known to those having skill in the art. Height control valve 234 includes a lever 248 that is attached to beam 212 via a link 250 and a bracket 254. For the sake of relative completeness, a brake system 228 including a brake chamber 230 is shown mounted on suspension assembly 214.

As mentioned above, axle/suspension system 210 is designed to absorb forces that act on the vehicle as it is operating. More particularly, it is desirable for axle/suspension system 210 to be rigid or stiff in order to resist roll forces and thus provide roll stability for the vehicle. This is typically accomplished by using beam 218, which is rigid, and also is rigidly connected to axle 232. It is also desirable, however, for axle/suspension system 210 to be flexible to assist in cushioning the vehicle (not shown) from vertical impacts and to provide compliance so that the axle/suspension system resists failure. Such flexibility typically is achieved through the pivotal connection of beam 218 to hanger 216 with bushing assembly 222. Air spring 224 and a shock absorber (not shown) also assist in cushioning the ride for cargo and passengers.

Figure 9A:
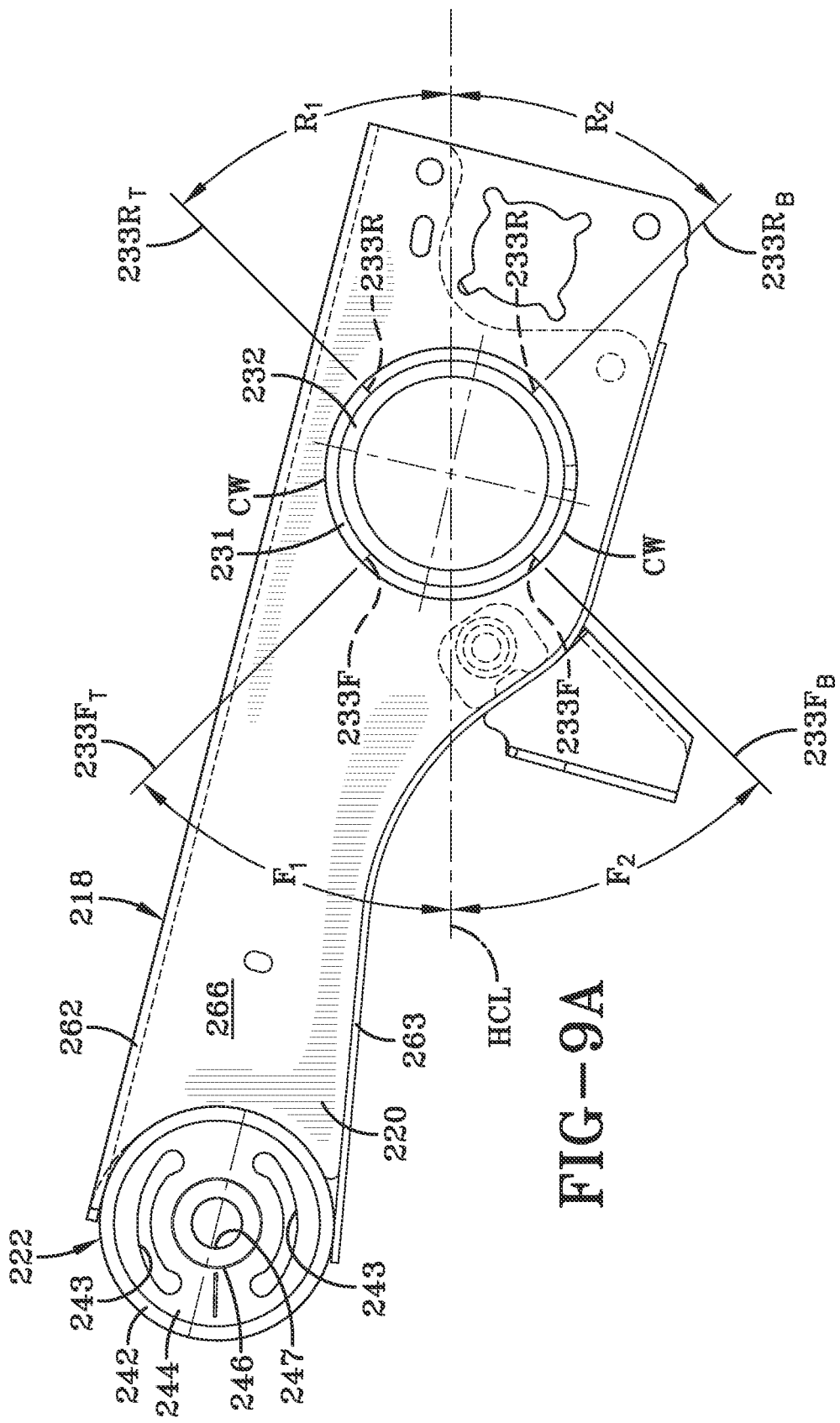
FIG. 9A is an enlarged elevational view of the suspension assembly beam shown in FIG. 9, with hidden portions represented by broken lines, showing the 5.75 inch large diameter axle mounted on the beam and showing the location of the front and rear sleeve windows relative to the axle, with the windows being positioned asymmetrically relative to the front and rear portions of the axle and the horizontal centerline of the axle at vehicle design ride height.

Turning now to FIG. 9A, beam 218 is shown generally oriented to ride height of the vehicle. Beam 218 includes sidewalls 266 (only one shown) integrally formed with a top plate 262 in a generally inverted U-shape. A bottom plate 263 is attached to the bottom portions of sidewalls 266 opposite top plate 262. Front end 220 of beam 218 includes bushing assembly 222 of a type which is well known in the heavy-duty axle/suspension system art. More particularly, bushing assembly 222 includes a mounting tube 242 formed of robust steel and an elastomeric bushing 244 press fit into the tube. Bushing 244 is molded about and adhesively attached to a central metal sleeve 246 formed with a continuous opening 247. Bushing sleeve 246 passes completely through bushing 244 and extends outwardly from the sidewalls thereof to facilitate pivotal mounting of beam 218 on hanger 216, which is described above. As is well known in the art, the durometer of elastomeric bushing 244 can be varied depending on the application and the bushing deflection properties desired. To generally achieve a softer ride in the vertical direction and a stiffer ride in the fore-aft direction, bushing 244 is formed with a pair of vertically-spaced voids 243 in each of its sidewalls.

Figure 10:
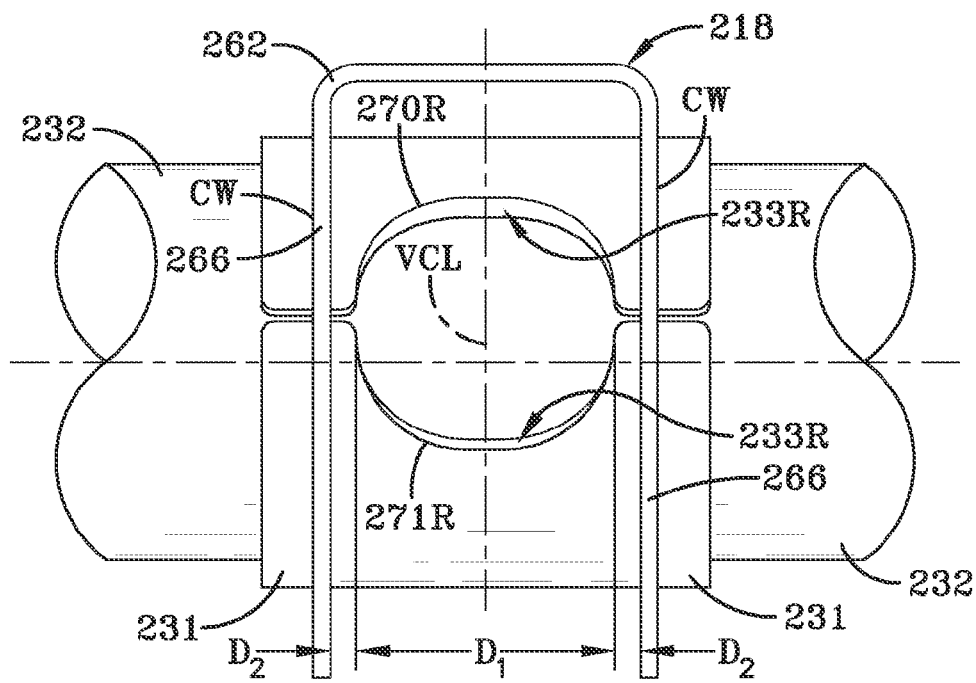
FIG. 10 is a greatly enlarged fragmentary rear elevational view of the axle-to-beam connection of the beam shown in FIG. 9, showing the rear window formed in the sleeve.
Figure 11:
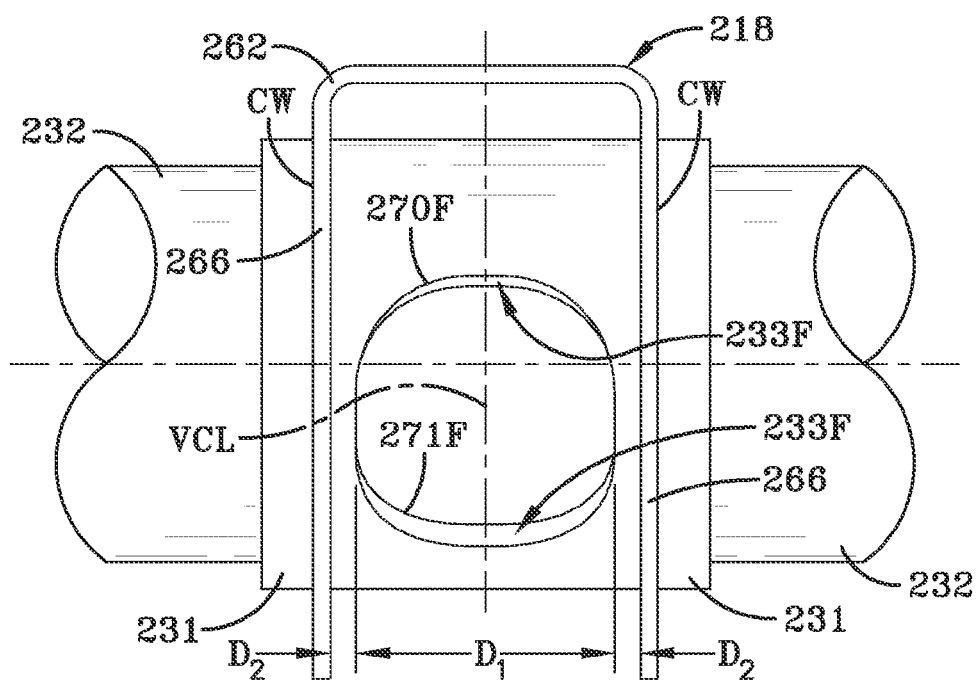
FIG. 11 is a greatly enlarged fragmentary front elevational view of the axle-to-beam connection of the beam shown in FIG. 9, showing the front window formed in the sleeve.

With continuing reference to FIG. 9A and with additional reference to FIGS. 10 and 11, axle 232 is shown surrounded by sleeve 231. A front window 233F is formed in sleeve 231 adjacent the front portion of axle 232. A rear window 233R is formed in sleeve 231 adjacent the rear portion of axle 232. A horizontal centerline HCL is shown bisecting axle 232 and defines the horizontal centerline of the axle when the vehicle is at design ride height. A pair of lines $233F_T$ and $233F_B$ extend generally frontward y from sleeve 231 and align with a top and a bottom edge 270F, 271F, respectively, and a vertical centerline VCL (FIG. 10) of front window 233F to form angles $F_1$ and $F_2$, respectively, relative to horizontal centerline HCL, where the values of $F_1$ and $F_2$ are about 37° and about 40', respectively. Likewise, a pair of lines $233R_T$ and $233R_B$ extend generally rearwardly from sleeve 231 and align with a top and a bottom edge 270R, 271R, respectively, and vertical centerline VCL (FIG. 10) of rear window 233R to form angles $R_1$ and $R_2$, respectively, relative to horizontal centerline HCL, where the values of $R_1$ and $R_2$ are about 33° and about 37°, respectively.

Rear window 233R is shown formed in sleeve 231 attached to axle 232 by a continuous weld (not shown) laid along the window in a manner well known to those skilled in the art. Rear window 233R has a width $D_1$ of about 3.75 inches. Moreover, rear window 233R is formed and located so that the inboard and outboard edges of the window are each a distance $D_2$ from its respective sidewall 266 interior surface of beam 218, where $D_2$ is equal to about 0.375 inches.

Front window 233F is shown formed in sleeve 231 which is disposed about and attached to axle 232 by a continuous weld (not shown) laid along the window in a manner well known to those skilled in the art. Front window 233F has a width $D_1$ of about 3.75 inches. Moreover, front window 233F is formed and located so that the inboard and outboard edges of the window are each a distance $D_2$ from its respective sidewall 266 interior surfaces of beam 218, where $D_2$ is equal to about 0.375 inches.

Axle/suspension system 210 of the present invention utilizes large diameter axle 232 with a generally thin wall, which is capable of maintaining the requisite stiffness for the heavy-duty vehicle market and is capable of being utilized on vehicles that carry more than about 23,000 lbs per axle. Maintenance of the requisite durability required in the heavy-duty vehicle industry for axle/suspension system 210 is accomplished by utilizing sleeve 231 at the axle-to-beam connection, which has a wall thickness of from about 0.324 inches to about 0.510 inches. This is also accomplished by forming front and rear windows 233F,R, respectively, on sleeve 231 so that the front and rear windows are generally located with the inboard and outboard edges of each window being located relatively farther from the interior surfaces of sidewalls 266 of beam 218 than prior art axle/suspension systems 10, 10' and 110. The distance $D_2$ between each inboard and outboard edge of front and rear windows 233F,R and its respective sidewall 266 interior surface of beam 218 is from about 0.250 inches to about 0.500 inches. Moreover, front and rear windows 233F,R are formed asymmetrically in size and shape, i.e., the front window is larger and shaped differently than the rear window. In addition, front and rear windows 233F,R, respectively, are formed in sleeve 231 so that they are asymmetrically angled with respect to horizontal centerline HCL at ride height of the vehicle. More specifically, front and rear windows 233F,R are formed such that front angle $F_1$ is from about 34° to about 40°, front angle $F_2$ is from about 37° to about 43°, rear angle $R_1$ is from about 30° to about 36°, and rear angle $R_2$ is from about 34° to about 40°. These structural characteristics provide the requisite stiffness and durability required by heavy-duty vehicles having a GAWR of greater than 23,000 lbs./axle.

More particularly, the durability of the circumferential welds at junction CW between sleeve 231 and each sidewall 266 of beam 218 is increased as a result of utilizing thinner walled axle 232 and thicker sleeve 231. However, utilization of thin walled axle 232 also decreases the durability of the continuous welds located at front and rear windows 233F,R. Therefore, in order to overcome this durability problem with the window welds caused by using thinner walled axle 232, axle/suspension system 210 of the present invention alters angles $F_1$, $F_2$, $R_1$, $R_2$ so that they are asymmetrical with respect to horizontal centerline HCL at the design ride height of the vehicle. The windows are also asymmetrical to one another with respect to their size and their shape. Axle/suspension system 210 also reduces the width $D_1$ of each front and rear window 233F,R and increases the distance $D_2$ of the inboard and outboard edges of each window from the interior surfaces of sidewalls 266 of beam 218. The resulting axle/suspension system 210 of the present invention provides weight savings over prior art axle suspension systems such as system 10 with a GAWR of greater than 23,000 lbs./axle using a standard size axle, yet still maintains the requisite stiffness and durability of the axle/suspension system required within the industry.

Figure 12:
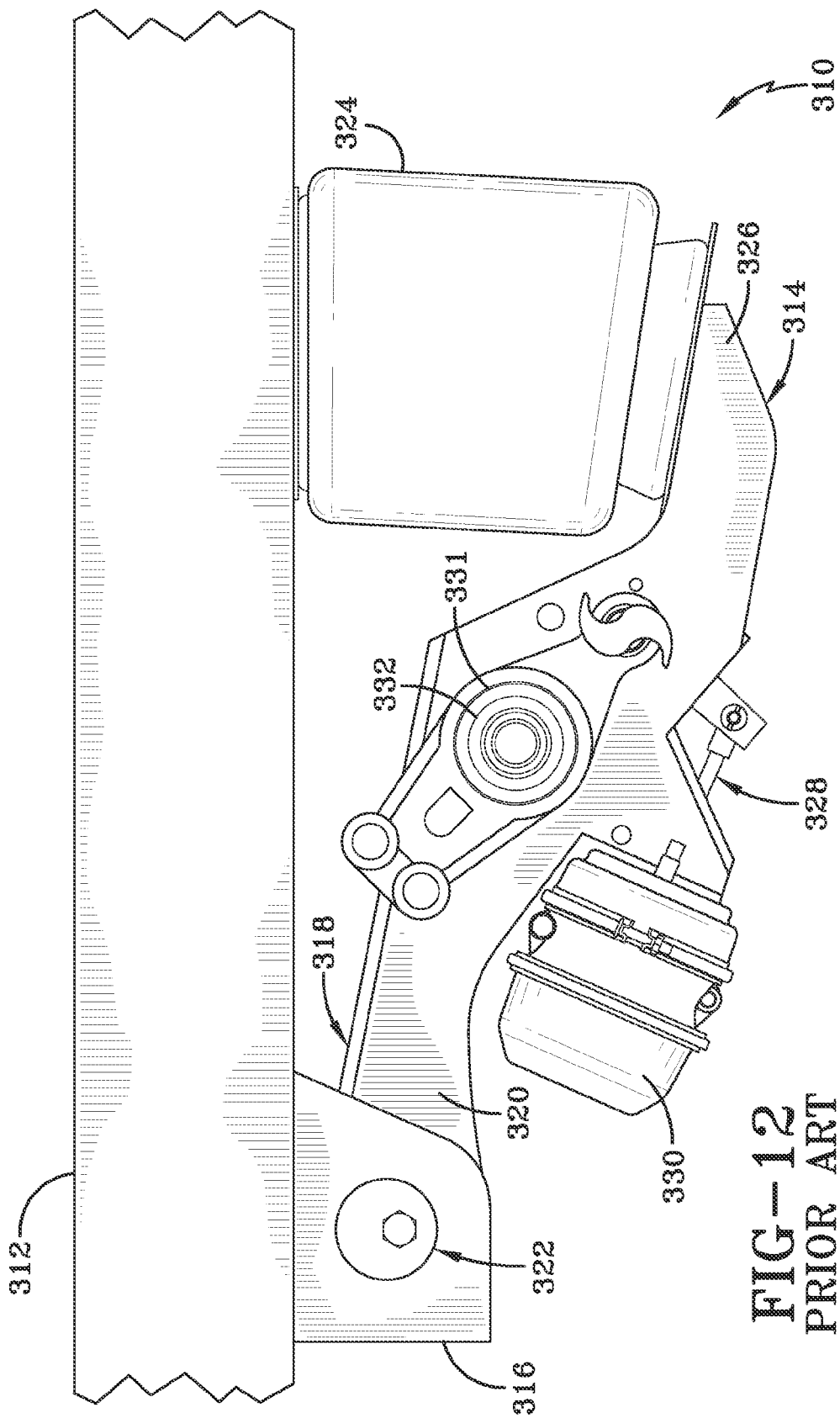
FIG. 12 is a fragmentary elevational view of a second preferred embodiment axle/suspension system of the present invention having a GAWR of greater than 23,000 lbs./axle and incorporating a 5.75 inch large diameter axle, showing one of the suspension assemblies of the axle/suspension system including the large diameter axle surrounded by and rigidly attached to a sleeve which in turn is surrounded by and rigidly attached to a tapered trailing arm underslung beam of the suspension assembly.

A second preferred embodiment of an axle/suspension system of the present invention having a GAWR of at least about greater than 23,000 lbs./axle and incorporating a large diameter axle 332, is shown generally at 310 in FIG. 12, and will now be described below. Axle/suspension system 310 of the present invention is similar n some respects to prior art axle/suspension systems 10, 10' and 110 described above, but is different in other respects.

Axle/suspension system 310 of the present invention is shown mounted on a main member 312 of the frame of a heavy-duty vehicle (not shown). It should be noted that main member 312 is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, main member 312 is shown in FIG. 12 as a primary frame. Moreover, because axle/suspension system 310 generally includes an identical pair of suspension assemblies 314, for sake of clarity only one of the suspension assemblies will be described below.

Suspension assembly 314 is pivotally connected to hanger 316 via a trailing arm underslung tapered beam 318. More specifically, trailing arm beam 318 includes a front end 320 having a bushing assembly 322, which includes a bushing, pivot bolts and washers as are well known in the art and will be described below, to facilitate pivotal connection of the beam to hanger 316. Beam 318 also includes a rear end 326, which is welded or otherwise rigidly attached to transversely-extending axle 332. Axle 332 is a large diameter axle having an outer diameter of about 5.75 inches and a wall thickness of about 0.367 inches. A sleeve 331 is disposed about axle 332 between the axle and beam 318. Sleeve 331 has a thickness of about 0.385 inches. A circumferential weld (not shown) is laid around axle 332 at a junction CW between sleeve 331 and each of a pair of sidewalls 366 (FIGS. 14 and 15) of beam 318.

Suspension assembly 314 also includes an air spring 324, mounted on and extending between a top plate 327 of rear end 326 of beam 318 and main member 312. For the sake of relative completeness, a brake system 328 including a brake chamber 330 is shown mounted on suspension assembly 314.

As mentioned above, axle/suspension system 310 is designed to absorb forces that act on the vehicle as it is operating. More particularly, it is desirable for axle/suspension system 310 to be rigid or stiff in order to resist roll forces and thus provide roll stability for the vehicle. This is typically accomplished by using beam 318, which is rigid, and also is rigidly connected to axle 332. It is also desirable, however, for axle/suspension system 310 to be flexible to assist in cushioning the vehicle (not shown) from vertical impacts and to provide compliance so that the axle/suspension system resists failure. Such flexibility typically is achieved through the pivotal connection of beam 318 to hanger 316 with bushing assembly 322. Air spring 324 and a shock absorber (not shown) also assist in cushioning the ride for cargo and passengers.

Figure 13:
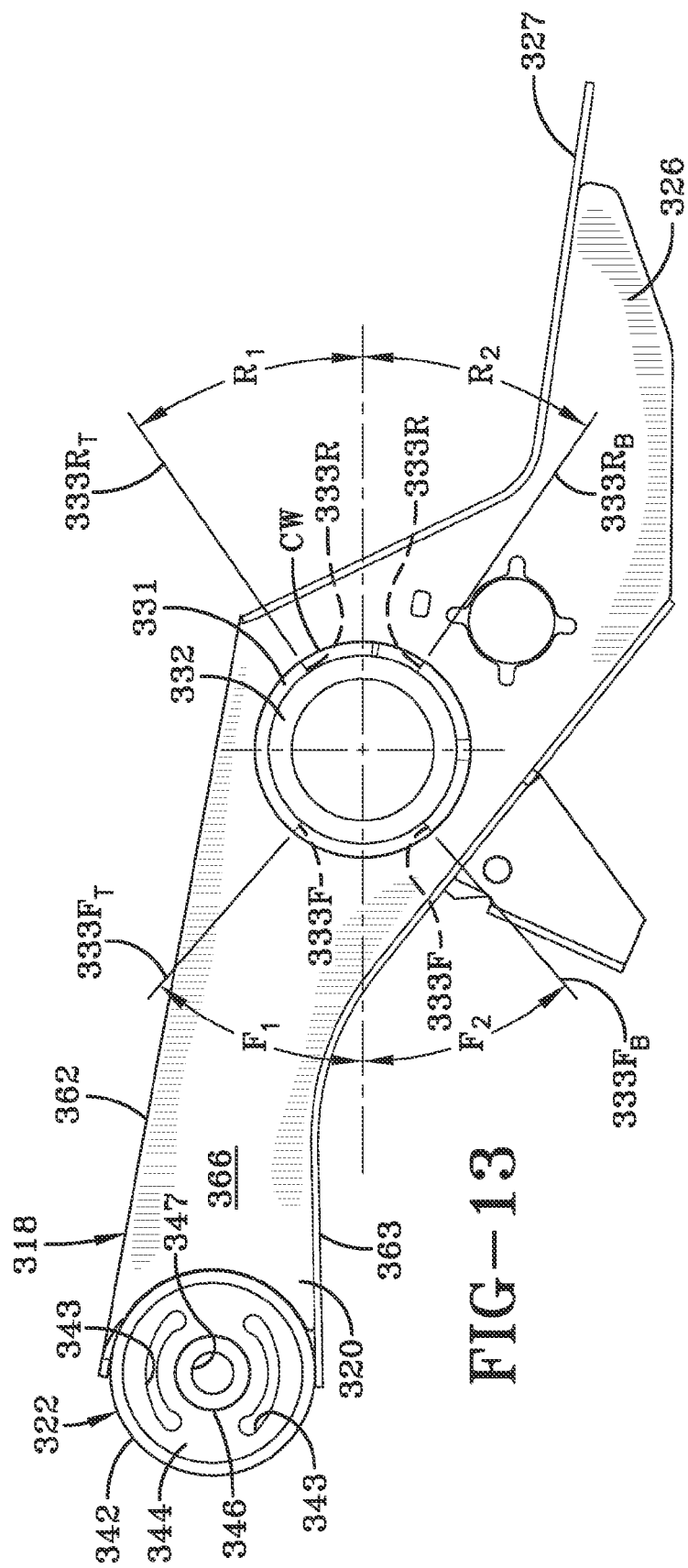
FIG. 13 is an enlarged elevational view of the suspension assembly beam shown in FIG. 12, with hidden portions represented by broken lines, showing the 5.75 inch large diameter axle mounted on the beam and showing the location of the front and rear sleeve windows relative to the axle and the horizontal centerline of the axle at vehicle design ride height.

Turning now to FIG. 13, beam 318 is shown generally oriented to ride height of the vehicle. Beam 318 includes sidewalls 366 (only one shown) integrally formed with a top plate 362 in a generally inverted U-shape. A bottom plate 363 is attached to the bottom portions of sidewalls 366 opposite top plate 362. Front end 320 of beam 318 includes bushing assembly 322 of a type which is well known in the heavy-duty axle/suspension system art. More particularly, bushing assembly 322 includes a mounting tube 342 formed of robust steel and an elastomeric hushing 344 press fit into the tube. Bushing 344 is molded about and adhesively attached to a central metal sleeve 346 formed with a continuous opening 347. Bushing sleeve 346 passes completely through bushing 344 and extends outwardly from the sidewalls thereof to facilitate pivotal mounting of beam 318 on hanger 316, which is described above. As is well known in the art, the durometer of elastomeric bushing 344 can be varied depending on the application and the hushing defection properties desired. To generally achieve a softer ride in the vertical direction and a stiffer ride in the fore-aft direction, bushing 344 is formed with a pair of vertically-spaced voids 343 in each of its sidewalls.

Figure 14:
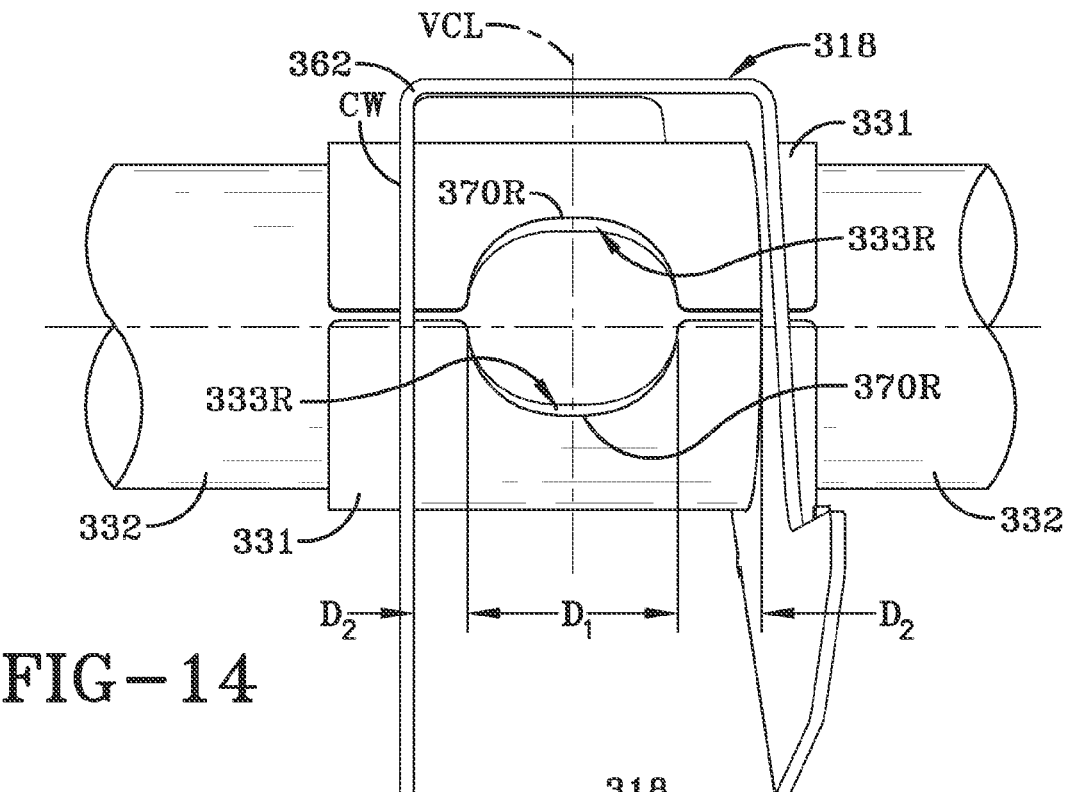
FIG. 14 is a greatly enlarged fragmentary rear elevational view of the axle-to-beam connection of the beam shown in FIG. 12, showing the rear window formed in the sleeve.
Figure 15:
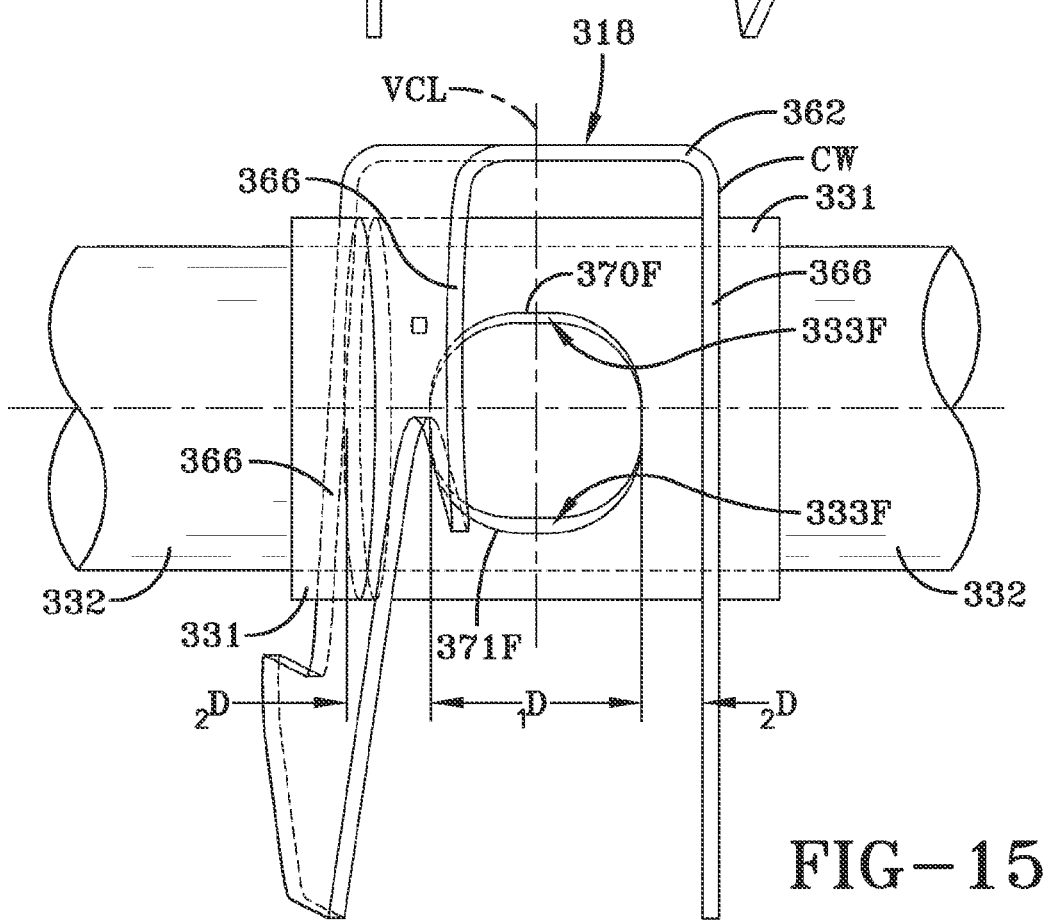
FIG. 15 is a greatly enlarged fragmentary front elevational view of the axle-to-beam connection of the beam shown in FIG. 12, showing the front window formed in the sleeve.

With continuing reference to FIG. 13 and with additional reference to FIGS. 14 and 15, axle 332 is shown surrounded by sleeve 331. A front window 333F' is formed in sleeve 331 adjacent the front portion of axle 332. A rear window 333R is formed in sleeve 331 adjacent the rear portion of axle 332. A horizontal centerline HCL is shown bisecting axle 332 and defines the horizontal centerline of the axle when the vehicle is at design ride height. A pair of lines $333F_T$ and $333F_B$ extend generally frontwardly from sleeve 331 and align with a top and a bottom edge 370F, 371F, respectively, and a vertical centerline VCL (FIG. 15) of front window 333F to form angles $F_1$ and $F_2$, respectively, relative to horizontal centerline HCL, where the values of $F_1$ and $F_2$ are about 40° and about 35°, respectively. Likewise, a pair of lines $333R_T$ and $333R_B$ extend generally rearwardly from sleeve 331 and align with a top and a bottom edge 370R, 371R, respectively, and vertical centerline VCL, (FIG. 14) of rear window 333R to form angles $R_1$ and $R_2$, respectively, relative to horizontal centerline HCL, where the values of $R_1$ and $R_2$ are about 25° and about 40°, respectively.

Rear window 333R is shown formed in sleeve 331 attached to axle 332 by a continuous weld (not shown) laid along the window in a manner well known to those skilled in the art. Rear window 333R has a width $D_1$ of about 4.876 inches. Moreover, rear window 333R is formed and located so that the inboard and outboard edges of the window are each a distance $D_2$ from its respective sidewall 366 interior surface of beam 318, where $D_2$ is equal to about 0.375 inches from the interior surface of the outboard sidewall and about 0.93 inches from the interior surface of the inboard sidewall.

Front window 333F is shown formed in sleeve 331 which is disposed about and attached to axle 332 by a continuous weld (not shown) laid along the window in a manner well known to those skilled in the art. Front window 333F has a width $D_1$ of about 4.876 inches. Moreover, front window 333F is formed and located so that the inboard and outboard edges of the window are each a distance $D_2$ from its respective sidewall 366 interior surfaces of beam 318, where $D_2$ is equal to about 0.375 inches.

Axle/suspension system 310 of the present invention utilizes large diameter axle 332 with a generally thin wall, which is capable of maintaining the requisite stiffness for the heavy-duty vehicle market and is capable of being utilized on vehicles that carry more than about 23,000 lbs per axle. Maintenance of the requisite durability required in the heavy-duty vehicle industry for axle/suspension system 310 is accomplished by utilizing sleeve 331 at the axle-to-beam connection which has a wall thickness of from about 0.324 inches to about 0.510 inches. This is also accomplished by forming front and rear windows 333F,R, respectively, on sleeve 331 so that the front and rear windows are generally located with the inboard and outboard edges of each window being located relatively farther from the interior surfaces of sidewalls 366 of beam 318 than prior art axle/suspension systems 10, 10' and 110. The distance $D_2$ between each inboard and outboard edge of front window 333F and its respective sidewall 366 interior surface of beam 318 is from about 0.25 inches to about 0.500 inches. The distance $D_2$ between the inboard edge of rear window 333R and its respective sidewall 366 interior surface of beam 318 is from about 0.770 to about 1.06 inches. The distance $D_2$ between the ouboard edge of rear window 333R and its respective sidewall 366 interiour surface of beam 318 is from about 0.250 inches to about 0.500 inches. Moreover, front and rear windows 333F,R are formed asymmetrically in size and shape, i.e., the front window is larger and shaped differently than the rear window. In addition, front and rear windows 333F,R, respectively, are formed in sleeve 331 so that they are asymmetrically angled with respect to horizontal centerline HCL at ride height of the vehicle. More specifically, front and rear windows 333F,R are formed such that front angle $F_1$ is from about 37° to about 43°, front angle $F_2$ is from about 32° to about 38°, rear angle $R_1$ is from about 22° to about 28°, and rear angle $R_2$ is from about 37° to about 43°. These structural characteristics provide the requisite stiffness and durability required by heavy-duty vehicles having a GAWR of greater than 23,000 lbs./axle.

More particularly, the durability of the circumferential welds at junction CW between sleeve 331 and each sidewall 366 of beam 318 is increased as a result of utilizing thinner walled axle 332 and thicker sleeve 331. However, utilization of thin walled axle 332 also decreases the durability of the continuous welds located at front and rear windows 333F,R. Therefore, in order to overcome this durability problem with the window welds caused by using thinner walled axle 332, axle/suspension system 310 of the present invention alters angles $F_1$, $F_2$, $R_1$, $R_2$ so that they are asymmetrical with respect to horizontal centerline HCL, at the design ride height of the vehicle. The windows are also asymmetrical to one another with respect to their size and their shape. Axle/suspension system 310 also reduces the width $D_1$ of each front and rear window 333F,R and increases the distance $D_2$ of the inboard and outboard edges of each window from the interior surfaces of sidewalls 366 of beam 318. The resulting axle/suspension system 310 of the present invention provides weight savings over prior art axle suspension systems such as system 10' with a GAWR of greater than 23,000 lbs./axle using a standard size axle, yet still maintains the requisite stillness and durability of the axle/suspension system required within the industry.

It should be understood that any combination of one or more of the structural characteristics of sleeve 331 set forth above, such as sleeve thickness, distance $D_2$ between the inboard and outboard edges of each window 333,F,R and the interior surfaces of beam sidewalls 366, and angles $F_1$, $F_2$, $R_1$, $R_2$ of the front and rear sleeve windows, respectively, including the asymmetrical angle of the front and rear sleeve windows with respect to horizontal centerline HCL of axle 332 at design ride height, could be utilized without changing the overall concept or operation of second preferred embodiment axle/suspension system 310 of the present invention.

It is contemplated that first and second preferred embodiment axle/suspension systems 210 and 310 of the present invention could be utilized on tractor-trailers or heavy-duty vehicles having one or more than one axle without changing the overall concept or operation of the present invention. It is further contemplated that first and second preferred embodiment axle/suspension systems 210 and 310 of the present invention could be utilized on vehicles having frames or subframes which are moveable or non-movable without changing the overall concept of the present invention. It is yet even further contemplated that first and second preferred embodiment axle/suspension systems 210 and 310 of the present invention could be utilized on all types of air-ride leading and/or trailing arm beam-type axle/suspension system designs known to those skilled in the art without changing the overall concept or operation of the present invention. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is yet even further contemplated that first and second preferred embodiment axle/suspension systems 210 and 310 of the present invention could be utilized in conjunction with axles having varied wall thicknesses, without changing the overall concept or operation of the present invention. It is also contemplated that first and second preferred embodiment axle/suspension systems 210 and 310 of the present invention could be utilized in conjunction with other types of air-ride rigid beam-type axle/suspension systems such as those using U-bolts, U-bolt brackets/axle seats and the like, without changing the overall concept or operation of the present invention. It is even further contemplated that first and second preferred embodiment axle/suspension systems 210 and 310 of the present invention could be utilized with other types of axle/suspension systems, such as those that utilize leaf springs, without changing the overall concept or operation of the present invention.

Accordingly, the axle/suspension system of the present invention is simplified, provides an effective, safe, inexpensive and efficient structure and method which achieves all the enumerated objectives, provides for eliminating difficulties encountered with prior art axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle-to-beam connection of the present invention is used and installed, the characteristics of the construction, arrangement and method steps, and the advantageous, new and useful results obtained; the new and useful structures, devices, elements, arrangements, process, parts, components and combinations are set forth in the appended claims.

What is claimed is:

1. An air-ride beam-type axle/suspension system for a heavy-duty vehicle including a large diameter axle and including a gross axle weight rating of greater than 23,000 lbs./axle comprising:
   a) a pair of transversely spaced beams, each one of said beams including an inboard sidewall and an outboard sidewall;
   b) an axle extending transversely between and being connected to said beams to form a pair of axle-to-beam connections;
   c) each one of said axle-to-beam connections comprising an axle sleeve rigidly connected to said axle and to its respective beam, said axle sleeve formed with at least a front window and a rear window, said front window being located generally between said inboard and outboard sidewalls of its respective beam and adjacent a front portion of the axle when said axle is in service and said axle/suspension system is at design ride height, said rear window being located generally between said inboard and outboard sidewalls of its respective beam and adjacent a rear portion of the axle when said axle is in service and the axle/suspension system is at design ride height, the axle sleeve formed with a thickness of from 0.324 inches to 0.510 inches.

2. The air-ride beam-type axle/suspension system for a heavy-duty vehicle of claim 1, said axle being formed with an outside diameter of greater than 5.0 inches.

3. The air-ride beam-type axle/suspension system for a heavy-duty vehicle of claim 1, said axle being formed with an outside diameter of 5.75 inches.

4. The air-ride beam-type axle/suspension system for a heavy-duty vehicle of claim 1, said axle/suspension system including a gross axle weight rating of greater than 23,000 lbs./axle.

5. The air-ride beam-type axle/suspension system for a heavy-duty vehicle of claim 1, said front and rear windows each being formed with a top and a bottom edge, said top edge of said front window being located 34° to 40° from a horizontal centerline of said axle when said axle is in service and said axle/suspension system is at design ride height, said bottom edge of said front window being located 37° to 43° from said horizontal centerline of the axle when said axle is in service and the axle/suspension system is at design ride height, said top edge of said rear window being located 30° to 36° from a horizontal centerline of said axle when said axle is in service and said axle/suspension system is at design ride height, said bottom edge of said rear window being located 34° to 40° from said horizontal centerline of the axle when said axle is in service and the axle/suspension system is at design ride height.

6. The air-ride beam-type axle/suspension system for a heavy-duty vehicle of claim 1, said front and rear sleeve windows each being formed with a top and a bottom edge, said top edge of said front window being located 37° to 43° from a horizontal centerline of said axle when said axle is in service and said axle/suspension system is at design ride height, said bottom edge of said front window being located 32° to 38° from said horizontal centerline of the axle when said axle is in service and the axle/suspension system is at design ride height, said top edge of said rear window being located 22° to 28° from a horizontal centerline of said axle when said axle is in service and said axle/suspension system is at design ride height, said bottom edge of said rear window being located 37° to 43° from said horizontal centerline of the axle when said axle is in service and the axle/suspension system is at design ride height.

7. The air-ride beam-type axle/suspension system for a heavy-duty vehicle of claim 1, said front and rear windows each being formed with a top and a bottom edge, said top edge of said front window being located 37° from a horizontal centerline of said axle when said axle is in service and said axle/suspension system is at design ride height, said bottom edge of said front window being located 40° from said horizontal centerline of the axle when said axle is in service and the axle/suspension system is at design ride height, said top edge of said rear window being located 33° from a horizontal centerline of said axle when said axle is in service and said axle/suspension system is at design ride height, said bottom edge of said rear window being located 37° from said horizontal centerline of the axle when said axle is in service and the axle/suspension system is at design ride height.

8. The air-ride beam-type axle/suspension system for a heavy-duty vehicle of claim 1, said front and rear sleeve windows each being formed with a top and a bottom edge, said top edge of said front window being located 40° from a horizontal centerline of said axle when said axle is in service and said axle/suspension system is at design ride height, said bottom edge of said front window being located 35° from said horizontal centerline of the axle when said axle is in service and the axle/suspension system is at design ride height, said top edge of said rear window being located 25° from a horizontal centerline of said axle when said axle is in service and said axle/suspension system is at design ride height, said bottom edge of said rear window being located 40° from said horizontal centerline of the axle when said axle is in service and the axle/suspension system is at design ride height.

9. The air-ride beam-type axle/suspension system of claim 1, said sleeve including a thickness of 0.385 inches.

10. The air-ride beam-type axle/suspension system of claim 1, said front and rear sleeve windows each being formed with an outboard edge, said inboard edge of said front window being located 0.250 inches to 0.500 inches from an interior surface of said beam inboard sidewall, said outboard edge of said front window being located 0.250 inches to 0.500 inches from an interior surface of said beam outboard sidewall, said inboard edge of said rear window being located 0.250 inches to 0.500 inches from an interior surface of said beam inboard sidewall, said outboard edge of said rear window being located 0.250 inches to 0.500 inches from an interior surface of said beam outboard sidewall.

11. The air-ride beam-type axle/suspension system of claim 1, said front and rear sleeve windows each being formed with an inboard edge and an outboard edge, said inboard edge of said front window being located 0.375 inches from an interior surface of said beam inboard sidewall, said outboard edge of said front window being located 0.375 inches from an interior surface of said beam outboard sidewall, said inboard edge of said rear window being located 0.375 inches from an interior surface of said beam inboard sidewall, said outboard edge of said rear window being located 0.375 inches from an interior surface of said beam outboard sidewall.

12. The air-ride beam-type axle/suspension system of claim 1, said front and rear sleeve windows each being formed with an outboard edge, said inboard edge of said front window being located 0.250 inches to 0.500 inches from an interior surface of said beam inboard sidewall, said outboard edge of said front window being located 0.250 inches to 0.500 inches from an interior surface of said beam outboard sidewall, said inboard edge of said rear window being located 0.770 inches to 1.06 inches from an interior surface of said beam inboard sidewall, said outboard edge of said rear window being located 0.250 inches to 0.500 inches from an interior surface of said beam outboard sidewall.

13. The air-ride beam-type axle/suspension system of claim 1, said front and rear sleeve windows each being formed with an inboard edge and an outboard edge, said inboard edge of said front window being located 0.375 inches from an interior surface of said beam inboard sidewall, said outboard edge of said front window being located 0.375 inches from an interior surface of said beam outboard sidewall, said inboard edge of said rear window being located 0.93 inches from an interior surface of said beam inboard sidewall, said outboard edge of said rear window being located 0.375 inches from an interior surface of said beam outboard sidewall.

14. The air-ride beam-type axle/suspension system of claim 1, said first and second windows being generally asymmetrically angled with respect to a horizontal centerline of said axle when the axle is in service and said axle/suspension system is at design ride height.

15. An air-ride beam-type axle/suspension system for a heavy-duty vehicle including a large diameter axle and including a gross axle weight rating of greater than 23,000 lbs./axle comprising:
   a) a pair of transversely spaced beams, each one of said beams including an inboard sidewall and an outboard sidewall;
   b) an axle extending transversely between and being connected to said beams to form a pair of axle-to-beam connections;
   c) each one of said axle-to-beam connections comprising an axle sleeve rigidly connected to said axle and to its respective beam, said axle sleeve formed with at least a front window and a rear window, said front window being located generally between said inboard and outboard sidewalls of its respective beam and adjacent a front portion of the axle when said axle is in service and said axle/suspension system is at design ride height, said rear window being located generally between said inboard and outboard sidewalls of its respective beam and adjacent a rear portion of the axle when said axle is in service and the axle/suspension system is at design ride height, said front and rear windows being generally asymmetrically angled with respect to a horizontal centerline of said axle when the axle is in service and said axle/suspension system is at design ride height.

16. The air-ride beam-type axle/suspension system for a heavy-duty vehicle of claim 15, said axle being formed with an outside diameter of greater than 5.0 inches.

17. The air-ride beam-type axle/suspension system for a heavy-duty vehicle of claim 15, said axle being formed with an outside diameter of 5.75 inches.

18. The air-ride beam-type axle/suspension system for a heavy-duty vehicle of claim 15, said axle/suspension system including a gross axle weight rating of greater than 23,000 lbs./axle.

19. The air-ride beam-type axle/suspension system for a heavy-duty vehicle of claim 15, said front and rear windows each being formed with a top and a bottom edge, said top edge of said front window being located 34° to 40° from a horizontal centerline of said axle when said axle is in service and said axle/suspension system is at design ride height, said bottom edge of said front window being located 37° to 43° from said horizontal centerline of the axle when said axle is in service and the axle/suspension system is at design ride height, said top edge of said rear window being located 30° to 36° from a horizontal centerline of said axle when said axle is in service and said axle/suspension system is at design ride height, said bottom edge of said rear window being located 34° to 40° from said horizontal centerline of the axle when said axle is in service and the axle/suspension system is at design ride height.

20. The air-ride beam-type axle/suspension system for a heavy-duty vehicle of claim 15, said front and rear sleeve windows each being formed with a top and a bottom edge, said top edge of said front window being located 37° to 43° from a horizontal centerline of said axle when said axle is in service and said axle/suspension system is at design ride height, said bottom edge of said front window being located 32° to 38° from said horizontal centerline of the axle when said axle is in service and the axle/suspension system is at design ride height, said top edge of said rear window being located 22° to 28° from a horizontal centerline of said axle when said axle is in service and said axle/suspension system is at design ride height, said bottom edge of said rear window being located 37° to 43° from said horizontal centerline of the axle when said axle is in service and the axle/suspension system is at design ride height.

21. The air-ride beam-type axle/suspension system for a heavy-duty vehicle of claim 15, said front and rear windows each being formed with a top and a bottom edge, said top edge of said front window being located 37° from a horizontal centerline of said axle when said axle is in service and said axle/suspension system is at design ride height, said bottom edge of said front window being located 40° from said horizontal centerline of the axle when said axle is in service and the axle/suspension system is at design ride height, said top edge of said rear window being located 33° from a horizontal centerline of said axle when said axle is in service and said axle/suspension system is at design ride height, said bottom edge of said rear window being located 37° from said horizontal centerline of the axle when said axle is in service and the axle/suspension system is at design ride height.

22. The air-ride beam-type axle/suspension system for a heavy-duty vehicle of claim 15, said front and rear sleeve windows each being formed with a top and a bottom edge, said top edge of said front window being located 40° from a horizontal centerline of said axle when said axle is in service and said axle/suspension system is at design ride height, said bottom edge of said front window being located 35° from said horizontal centerline of the axle when said axle is in service and the axle/suspension system is at design ride height, said top edge of said rear window being located 25° from a horizontal centerline of said axle when said axle is in service and said axle/suspension system is at design ride height, said bottom edge of said rear window being located 40° from said horizontal centerline of the axle when said axle is in service and the axle/suspension system is at design ride height.

23. The air-ride beam-type axle/suspension system of claim 15, said sleeve including a thickness of 0.385 inches.

24. The air-ride beam-type axle/suspension system of claim 15, said front and rear sleeve windows each being formed with an outboard edge, said inboard edge of said front window being located 0.250 inches to 0.500 inches from an interior surface of said beam inboard sidewall, said outboard edge of said front window being located 0.250 inches to 0.500 inches from an interior surface of said beam outboard sidewall, said inboard edge of said rear window being located 0.250 inches to 0.500 inches from an interior surface of said beam inboard sidewall, said outboard edge of said rear window being located 0.250 inches to 0.500 inches from an interior surface of said beam outboard sidewall.

25. The air-ride beam-type axle/suspension system of claim 15, said front and rear sleeve windows each being formed with an inboard edge and an outboard edge, said inboard edge of said front window being located 0.375 inches from an interior surface of said beam inboard sidewall, said outboard edge of said front window being located 0.375 inches from an interior surface of said beam outboard sidewall, said inboard edge of said rear window being located 0.375 inches from an interior surface of said beam inboard sidewall, said outboard edge of said rear window being located 0.375 inches from an interior surface of said beam outboard sidewall.

26. The air-ride beam-type axle/suspension system of claim 15, said front and rear sleeve windows each being formed with an outboard edge, said inboard edge of said front window being located 0.250 inches to 0.500 inches from an interior surface of said beam inboard sidewall, said outboard edge of said front window being located 0.250 inches to 0.500 inches from an interior surface of said beam outboard sidewall, said inboard edge of said rear window being located 0.770 inches to 1.06 inches from an interior surface of said beam inboard sidewall, said outboard edge of said rear window being located 0.250 inches to 0.500 inches from an interior surface of said beam outboard sidewall.

27. The air-ride beam-type axle/suspension system of claim 15, said front and rear sleeve windows each being formed with an inboard edge and an outboard edge, said inboard edge of said front window being located 0.375 inches from an interior surface of said beam inboard sidewall, said outboard edge of said front window being located 0.375 inches from an interior surface of said beam outboard sidewall, said inboard edge of said rear window being located 0.93 inches from an interior surface of said beam inboard sidewall, said outboard edge of said rear window being located 0.375 inches from an interior surface of said beam outboard sidewall.

28. The air-ride beam-type axle/suspension system of claim 15, said sleeve including a thickness of from 0.324 inches to 0.510 inches.

* * * * *

UNITED STATES PATENT AND TRADEMARK OFFICE
CERTIFICATE OF CORRECTION

PATENT NO. : 8,419,029 B2  
APPLICATION NO. : 13/043668  
DATED : April 16, 2013  
INVENTOR(S) : Brett L. Muckelrath et al.

Page 1 of 1

It is certified that error appears in the above-identified patent and that said Letters Patent is hereby corrected as shown below:

In the Claims:

Amend Claim 10, Column 20, line 51, after the word "an" insert --inboard edge and an--.

Amend Claim 12, Column 21, line 8, after the word "an" insert --inboard edge and an--.

Amend Claim 24, Column 23, line 5, after the word "an" insert --inboard edge and an--.

Amend Claim 26, Column 24, line 1, after the word "an" insert --inboard edge and an--.

Signed and Sealed this
Second Day of July, 2013

Teresa Stanek Rea
*Acting Director of the United States Patent and Trademark Office*